US012525011B2

United States Patent
Nussbaum et al.

(10) Patent No.: US 12,525,011 B2
(45) Date of Patent: *Jan. 13, 2026

(54) METHOD AND SYSTEM FOR VIRTUAL AREA VISUALIZATION

(71) Applicant: State Farm Mutual Automobile Insurance Company, Bloomington, IL (US)

(72) Inventors: Bryan R. Nussbaum, Bloomington, IL (US); Rebecca A Little, Mesa, AZ (US); Kevin L. Mitchell, Tempe, AZ (US); Nathan C. Summers, Mesa, AZ (US); An Ho, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,357

(22) Filed: Jun. 19, 2023

(65) Prior Publication Data

US 2023/0334849 A1 Oct. 19, 2023

Related U.S. Application Data

(63) Continuation of application No. 17/191,290, filed on Mar. 3, 2021, now Pat. No. 11,682,168, which is a
(Continued)

(51) Int. Cl.
*G06V 20/13* (2022.01)
*G06N 3/006* (2023.01)
(Continued)

(52) U.S. Cl.
CPC ............. *G06V 20/13* (2022.01); *G06N 3/006* (2013.01); *G06T 17/05* (2013.01); *G06T 19/006* (2013.01);
(Continued)

(58) Field of Classification Search
CPC ........ G06V 20/13; G06V 20/17; G06V 20/20; G06V 10/235; G06V 10/95; G06N 3/006; G06N 17/05; G06T 19/006
(Continued)

(56) References Cited

U.S. PATENT DOCUMENTS

| 7,395,151 B2 | 7/2008 | O'Neill et al. |
| 8,453,219 B2 | 5/2013 | Shuster et al. |

(Continued)

FOREIGN PATENT DOCUMENTS

| EP | 3239686 | 11/2017 |
| EP | 3578433 A1 | 4/2019 |

(Continued)

OTHER PUBLICATIONS

Non Final Office Action dated Feb. 13, 2020 for U.S. Appl. No. 15/919,520 "Method and System for Virtual Area Visualization" Nussbaum, 28 pages.

(Continued)

*Primary Examiner* — Hai Tao Sun
(74) *Attorney, Agent, or Firm* — Lee & Hayes, P.C.

(57) ABSTRACT

A computer-implemented method and system for virtual visualization of overall regions are disclosed. Images of an overall region may be obtained by a server and used to generate a virtual model of the overall region. The server may generate a virtual environment that includes the virtual model of the overall region. A user may indicate a specific area of the virtual environment. The server may then dispatch an imaging vehicle to the location of the indicated area to capture additional image data representative of the indicated area. This additional set of image data may be used by the server to generate higher resolution virtual models of the indicated area that are integrated into the virtual environment.

18 Claims, 22 Drawing Sheets

Related U.S. Application Data continuation of application No. 15/919,520, filed on Mar. 13, 2018, now Pat. No. 10,970,923.

(51) Int. Cl.

| | | |
|---|---|---|
| *G06T 17/05* | (2011.01) | |
| *G06T 19/00* | (2011.01) | |
| *G06V 10/22* | (2022.01) | |
| *G06V 10/94* | (2022.01) | |
| *G06V 20/17* | (2022.01) | |
| *G06V 20/20* | (2022.01) | |

(52) U.S. Cl.
CPC ............ *G06V 10/235* (2022.01); *G06V 10/95* (2022.01); *G06V 20/17* (2022.01); *G06V 20/20* (2022.01)

(58) Field of Classification Search
USPC ........................................................ 345/419
See application file for complete search history.

(56) References Cited

U.S. PATENT DOCUMENTS

| | | |
|---|---|---|
| 8,756,085 B1 | 6/2014 | Plummer et al. |
| 9,311,271 B2 | 4/2016 | Wright |
| 9,354,045 B1 | 5/2016 | Best |
| 9,563,201 B1 | 2/2017 | Tofte et al. |
| 9,633,487 B2 | 4/2017 | Wright |
| 9,721,304 B1 | 8/2017 | Parchment et al. |
| 9,830,748 B2 | 11/2017 | Rosenbaum |
| 9,990,782 B2 | 6/2018 | Rosenbaum |
| 10,127,722 B2 | 11/2018 | Shakib et al. |
| 10,192,369 B2 | 1/2019 | Wright |
| 10,198,879 B2 | 2/2019 | Wright |
| 10,217,168 B2 | 2/2019 | Tofte et al. |
| 10,269,190 B2 | 4/2019 | Rosenbaum |
| 10,459,706 B1 | 10/2019 | Little et al. |
| 10,467,824 B2 | 11/2019 | Rosenbaum |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2004/0193441 A1 | 9/2004 | Altieri |
| 2009/0138290 A1 | 5/2009 | Holden |
| 2009/0225001 A1* | 9/2009 | Biocca ............... G02B 27/0172 345/8 |
| 2011/0218825 A1 | 9/2011 | Hertenstein |
| 2012/0019522 A1* | 1/2012 | Lawrence ............... G06T 17/00 345/419 |
| 2012/0076437 A1 | 3/2012 | King |
| 2012/0096384 A1 | 4/2012 | Albert et al. |
| 2012/0155719 A1 | 6/2012 | Yun et al. |
| 2013/0321400 A1* | 12/2013 | van Os ............... G06F 16/2291 345/419 |
| 2014/0119648 A1 | 5/2014 | Park et al. |
| 2015/0268058 A1 | 9/2015 | Samarasekera et al. |
| 2016/0061622 A1 | 3/2016 | Ren et al. |
| 2016/0313736 A1* | 10/2016 | Schultz ................. H04N 21/47 |
| 2016/0350596 A1 | 12/2016 | Bataller et al. |
| 2017/0089710 A1 | 3/2017 | Slusar |
| 2017/0090460 A1 | 3/2017 | Andrew et al. |
| 2017/0148102 A1 | 5/2017 | Franke et al. |
| 2017/0192631 A1 | 7/2017 | Lee et al. |
| 2017/0251143 A1 | 8/2017 | Peruch et al. |
| 2017/0278409 A1 | 9/2017 | Johnson et al. |
| 2017/0359712 A1 | 12/2017 | Meredith et al. |
| 2018/0003516 A1 | 1/2018 | Khasis |
| 2018/0004498 A1 | 1/2018 | Meyer |
| 2018/0040039 A1 | 2/2018 | Wells et al. |
| 2018/0165616 A1 | 6/2018 | Sun et al. |
| 2019/0014319 A1 | 1/2019 | Jannard et al. |
| 2019/0095877 A1 | 3/2019 | Li |
| 2019/0095963 A1 | 3/2019 | Martin |
| 2019/0102752 A1 | 4/2019 | Valenti et al. |
| 2019/0130768 A1 | 5/2019 | Clark |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 A1 | 4/2020 |
| EP | 3960576 A1 | 3/2022 |
| EP | 4190659 | 6/2023 |
| EP | 4190660 A1 | 6/2023 |

OTHER PUBLICATIONS

Office Action for U.S. Appl. No. 17/191,290, mailed on Jan. 7, 2022, Nussbaum, "Method and System for Virtual Area Visualization", 37 pages.
Office Action for U.S. Appl. No. 17/191,290, mailed on Apr. 29, 2022, Nussbaum, "Method and System for Virtual Area Visualization", 47 pages.
Final Office Action dated Jul. 2, 2020 for U.S. Appl. No. 15/919,520 "Method and System for Virtual Area Visualization" Nussbaum, 32 pages.
Office Action for U.S. Appl. No. 17/191,290, mailed on Sep. 7, 2022, Nussbaum, "S369Method and System for Virtual Area Visualization", 49 pages.

\* cited by examiner

METHOD AND SYSTEM FOR VIRTUAL AREA VISUALIZATION

CROSS-REFERENCE TO RELATED APPLICATIONS

This application is a continuation of, and claims priority to U.S. patent application Ser. No. 17/191,290, filed on Mar. 3, 2021, and entitled "METHOD AND SYSTEM FOR VIRTUAL AREA VISUALIZATION", which is a continuation of, and claims priority to U.S. patent application Ser. No. 15/919,520, filed on Mar. 13, 2018, now U.S. Pat. No. 10,970,923, issued Apr. 6, 2021, and entitled "METHOD AND SYSTEM FOR VIRTUAL AREA VISUALIZATION", the entire contents of which are hereby expressly incorporated herein by reference.

FIELD OF THE DISCLOSURE

The present disclosure relates to virtual visualization of a physical region, and, in particular, to imaging techniques that integrate virtual models of the overall region and features that are located therein.

BACKGROUND

Virtual visualization enables one to view a physical region without having to actually visit the physical region. Virtual visualization is particularly useful in situations in which physically visiting the physical region is difficult, expensive, dangerous, or impossible. For example when a disaster (e.g., a hurricane, a flood, a wildfire, a tornado, etc.) strikes, it is often unsafe to visit the impacted area. Accordingly, it is useful to virtually view the physical region by generating one or more virtual models of the physical region and the various features therein. Thus, users can evaluate the impacted area without being exposed to the dangers caused by the disaster.

However, virtual models of large-scale areas are typically generated at low resolutions. Accordingly, while these large-scale virtual models are able to provide some capacity to evaluate the overall region, they generally do not provide sufficient detail to perform some tasks. For example, low resolution models generally cannot convey damage to structures or property with sufficient detail to determine an extent of damage. As another example, low resolution models may be insufficient to determine if a roadway is blocked or if an alternative, off-road route is available. Thus, there is a need to generate higher resolution models of certain areas within the larger region impacted by a disaster and to integrate these higher resolution models into the visualization of the larger region.

SUMMARY

In one aspect, a computer-implemented method of visualizing overall regions is provided. A server obtains a first set of image data indicative of an overall region. The first set of image data is captured by a remote imaging vehicle. The server generates a virtual model of the overall region based upon the obtained first set of image data. The server provides a virtual environment including the virtual model of the overall region for rendering by an electronic user device. The server receives, from the user electronic device, a request to capture additional image data of an indicated area within the overall region. The server transmits, to a remote control client, a request to dispatch a remote imaging vehicle to capture a second set of image data, wherein the second set of image data includes image data representative of the indicated area within the overall region. The server obtains the second set of image data and the server generates a virtual model for the indicated area within the overall region. The virtual model for the indicated area within the overall region has a higher resolution than the virtual model for the overall region. The server integrates the virtual model for the indicated area within the overall region into the virtual environment.

In another aspect, a server for visualizing overall regions is provided. The server includes one or more processors in addition to one or more transceivers. The server also includes a non-transitory program memory coupled to the one or more processors and storing executable instructions that, when executed by the one or more processors, cause the server to perform various functions described herein. For example, the server obtains, via the one or more processors, a set of image data indicative of an overall region. The first set of image data is captured by a remote imaging vehicle. The server generates, via the one or more processors, a virtual model of the overall region based upon the obtained first set of image data. The server provides, via the one or more processors, a virtual environment including the virtual model of the overall region. The server receives, via the one or more transceivers, a request to capture additional image data of an indicated area within the overall region. The server transmits, via the one or more transceivers, a request to dispatch a remote imaging vehicle to capture a second set of image data. The second set of image data includes image data representative of the indicated area within the overall region. The server obtains, by the one or more processors, the second set of image data and the server generates, by the one or more processors, a virtual model for the indicated area within the overall region. The virtual model for the indicated area within the overall region has a higher resolution than the virtual model for the overall region. The server integrates, by the one or more processors, the virtual model for the indicated area within the overall region into the virtual environment.

In yet another aspect, a non-transitory computer-readable storage medium storing processor-executable instructions is provided. These processor-executable instructions, when executed, cause one or more processors to obtain, by a server, a first set of image data indicative of an overall region. The first set of image data is captured by a remote imaging vehicle. The server generates a virtual model of the overall region based upon the obtained first set of image data. The server provides a virtual environment including the virtual model of the overall region for rendering by a user electronic device. The server receives, from the user electronic device, a request to capture additional image data of an indicated area within the overall region and the server transmits, to a remote control client, a request to dispatch a remote imaging vehicle to capture a second set of image data. The second set of image data includes image data representative of the indicated area within the overall region. The server obtains the second set of image data and generates a virtual model for the indicated area within the overall region. The virtual model for the indicated area within the overall region has a higher resolution than the virtual model for the overall region. The server integrates the virtual model for the indicated area within the overall region into the virtual environment.

DETAILED DESCRIPTION

Figure 1:
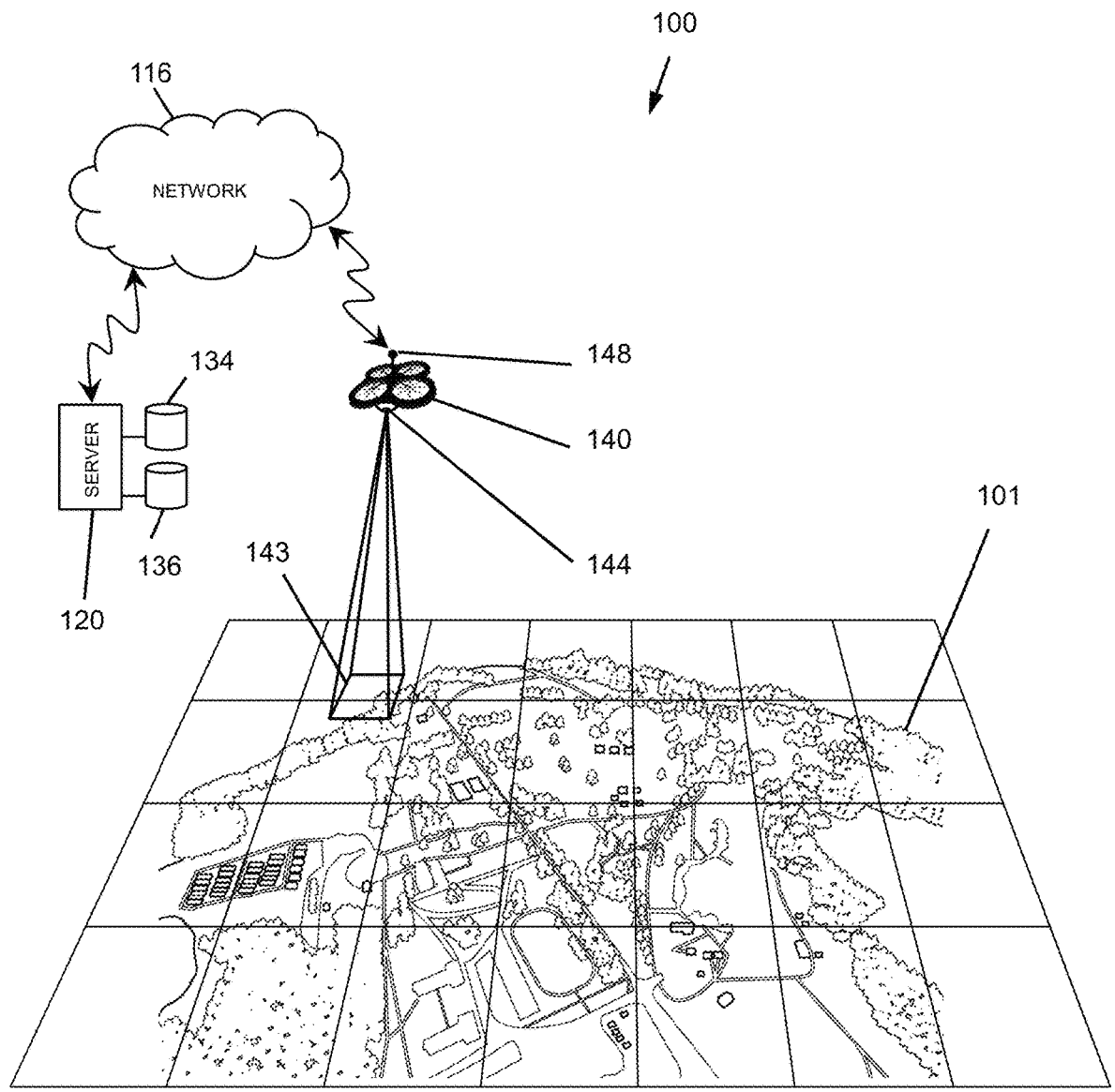
FIG. 1 depicts an example environment for capturing a set of image data representative of an overall region.

Methods, systems, and virtualization software applications and associated graphical user interfaces (GUIs) for virtual visualization of overall physical regions are described herein. To this end, the visualization may include a virtual environment in which a virtual model of an overall region is rendered. According to aspects, features, such as structures, vegetation, vehicles, river banks, roadways, or other objects that may be damaged by disasters, within the overall region are also modeled and rendered within the virtual environment. The virtual environment may be viewed by a user for the purpose of emergency response, damage assessment and/or filing of insurance claims.

To generate a virtual model of an overall region, a server may dispatch an imaging vehicle to capture a set of image data indicative of the overall region. The imaging vehicle may be, for example, an aerial imaging drone, an imaging crawler robot, an aquatic imaging drone, or any other imaging vehicle. The imaging vehicle may be controlled autonomously, semi-autonomously, or manually by either a remote or an on-site controller or pilot. The imaging vehicle may traverse the overall region to capture a set of image data representative of the overall region. The imaging vehicle may transmit the captured set of image data to the server for storage.

In some implementations, a user and/or the server may determine one or more image capture characteristics for the set of image data, such as an image resolution, an image capture rate, an image angle, an altitude from which image data is captured, and/or a travel path of the imaging vehicle. In manual implementations, the user may select from a menu of previously determined routines and functions to set the image capture characteristics.

A server obtains the captured set of image data to generate a virtual model of the overall region using virtual modeling techniques described below. The server may then store the generated virtual models in a model database. In some embodiments, the model database may store multiple versions of a particular virtual model. For example, one version of the virtual model may be based on image data captured prior to damage occurring and a second version of the virtual model may be based on image data captured after damage has occurred. Accordingly, the server may associate each virtual model with a timestamp to enable the rendering of a virtual environment that depicts the overall region at various points in time.

A user may interact with a user electronic device to initiate a rendering of the virtual environment. The user electronic device may be a computer, a smart phone, a tablet, smart glasses or goggles, a smart watch, a personal virtual reality device, a visualization base station, or any other electronic device. In some embodiments, the user electronic device is interconnected with a separate display device to enable the user to view the virtual environment in a virtual or mixed reality environment. According to aspects, the display device may be a flat panel screen, virtual reality display device, or a mixed-reality display device communicatively coupled to the user electronic device. In other embodiments, the display device may be the user electronic device (such as when the display device is a virtual or mixed reality headset capable of communicating directly with the server).

In response, the server may provide a virtual environment that includes the virtual model of the overall region. It should be appreciated that the when the user views the virtual environment via the display device, portions of the virtual environment may not be visible. To this end, the portion of virtual environment visible to the user may be defined by a virtual camera object. The user may interact with the display device to move or otherwise interact with the virtual camera object. For example, the user may move, zoom, rotate, or otherwise adjust the virtual camera object. The portion of the virtual environment viewable from the virtual camera object is referred to as the viewing angle.

In some embodiments, the user electronic device analyzes a viewing angle to determine how the virtual environment should be depicted by the display device. In these embodiments, rendering involves the user electronic device analyzing the virtual models to determine how the display device should depict the virtual environment based on the viewing angle. In embodiments that communications that have sufficiently low latency, such as 5G technologies and beyond, the user electronic device may transmit indications to the server of any change to the viewing angle and the server may respond with visual representations of how the virtual environment should be depicted. Accordingly, in these embodiments, "providing" the virtual environment to a user electronic device for rendering may include the server's response indicating how the virtual environment should be depicted.

In one aspect, the user may interact with the virtual environment to coordinate a response to damage that occurred to the overall region. One example response includes assessing the extent of the damage to the overall region or to structures therein. As another example, the response may include deploying emergency response vehicles to an appropriate location within the overall region. As yet another example, the response may include tracking the recovery efforts with regards to particular features. In this manner the user may coordinate a response to an emergency without physically visiting the hazardous locations within the modeled regions.

In some embodiments, the server may generate an overlay on the virtual environment to depict information associated with particular regions and/or features. The server may then update the virtual environment to include one or more overlays. Accordingly, when the user electronic device renders the virtual environment, the virtual environment may include these overlays. In some embodiments, the overlays may also include interactive interface elements. For example, an overlay may include an interface element that enables the user to request the capture of additional image data of a particular feature or region (an "indicated area within an overall region"). As another example, an overlay may include an interface element that enables the user to view a virtual environment that includes a high resolution model of the particular structure or region.

FIG. 1 depicts an example environment 100 for capturing a set of image data representative of an overall region 101. As illustrated, that environment 100 includes an imaging vehicle 140 configured to capture the set of image data. The overall region 101 may include a plurality of features, including structures. Although FIG. 1 only depicts a single imaging vehicle 140, in other embodiments multiple imaging vehicles 140 may be used to capture the set of image data. Further, while FIG. 1 depicts the imaging vehicle 140 as an aerial drone, additionally or alternatively, the imaging vehicle(s) 140 may include a non-aerial drone or vehicle, such as a crawler or an aquatic drone. Further, although the image data is generally described herein as being visual-spectrum image data, the image data may include thermal imaging data and/or image data indicative of radiation levels.

According to certain aspects, the imaging vehicle 140 may be manually or autonomously piloted to capture a set of image data while traversing the overall region 101. The imaging vehicle 140 may include an imaging apparatus 144 configured to capture image data indicative of a field of imaging 143. As the imaging vehicle 140 traverses the overall region 101, the field of imaging 143 also moves. Accordingly, the imaging vehicle 140 may capture imaging data indicative of the different portions of the overall region 101. It should be appreciated that in some embodiments, the field of imaging 143 is not at a fixed angle below the imaging vehicle 140, but may pan, tilt, and/or zoom to capture image data indicative of the overall region 101 at different angles. In some implementations, the imaging vehicle 140 captures image data such that there is an overlap between successive sets of captured image data. These overlaps provide additional image data about the same location of the overall region 101, which enables more accurate determination of the dimensions of features (e.g., structures, trees, roads, water, and so on) of the overall region. It should be appreciated that if the imaging vehicle 140 captures the set of image data at a high-altitude and/or without focusing on a particular portion of the overall region 101, the set of image data may lack sufficient detail to support some of the aforementioned emergency response tasks.

The imaging vehicle 140 may also include a communication apparatus 148 for transmitting, via a wireless communication network 116, the captured set of image data to a server 120. The communication network 116 may support communications via any standard or technology (e.g., GSM, CDMA, TDMA, WCDMA, LTE, EDGE, OFDM, GPRS, EV-DO, UWB, IEEE 802 including Ethernet, WiMAX, and/or others). The server 120 may store the transmitted image data at an image database 134.

According to aspects, the server 120 may analyze the image data stored at the image database 134 to generate virtual models of the overall region 101. To generate a virtual model, the server 120 may analyze the image data to determine dimensions for the various features of the overall region 101 and/or to adapt the image data to appear on the appropriate dimension of each feature. In some implementations, the server 120 generates a virtual model for a plurality of the features of the overall region 101. Accordingly, the virtual model for the overall region 101 may include several virtual models of the various features of the overall region 101. The server 120 may then store the generated virtual models at a model database 136.

Figure 2:
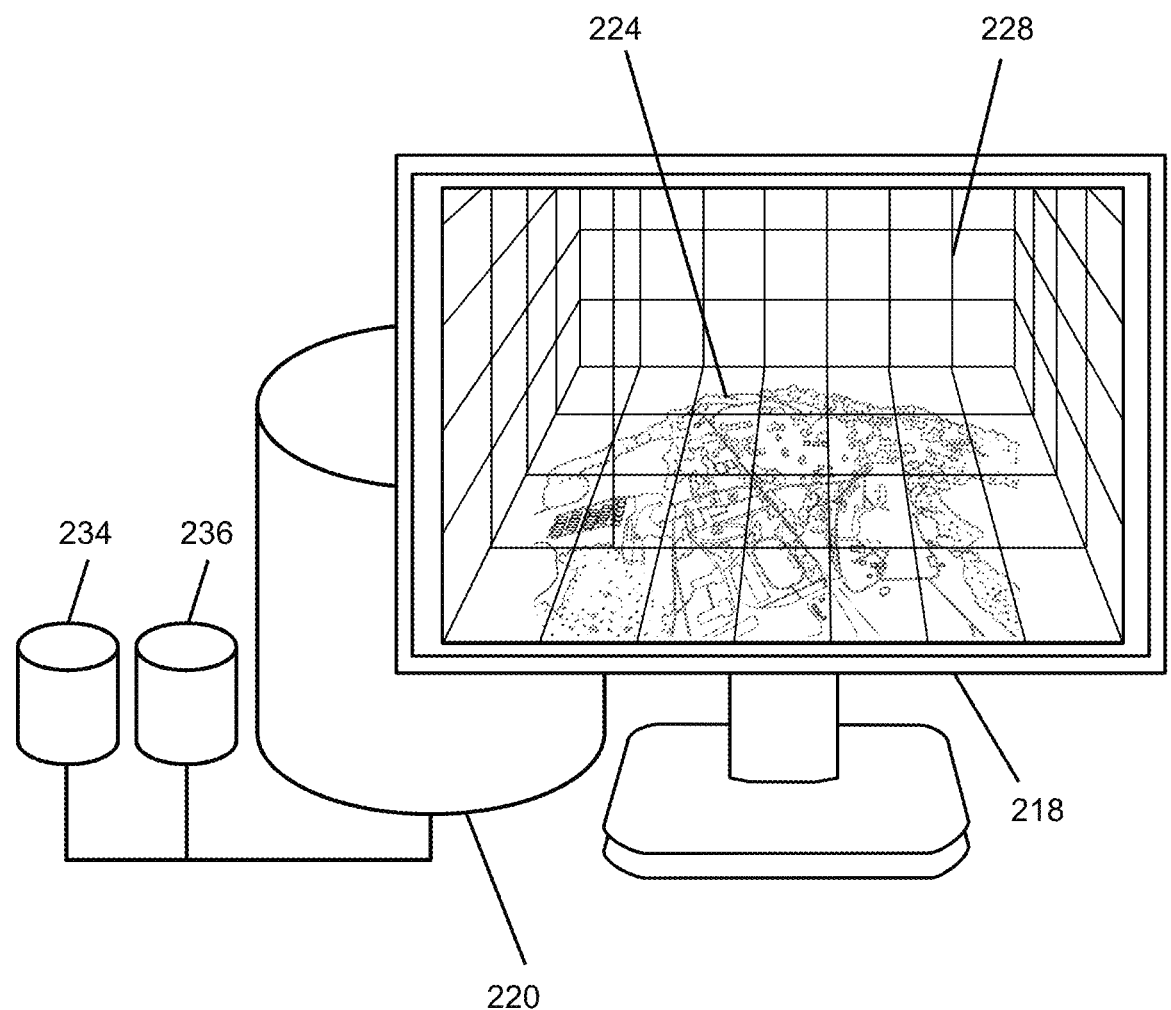
FIG. 2 depicts a rendering of a virtual environment that includes a virtual model of an overall region.

FIG. 2 depicts a rendering 224 of a virtual environment 228 that includes a virtual model of an overall region. In the illustrated embodiment, the rendering 224 is displayed on a display screen 218. To generate the rendering 224, a server 220 (such as the server 120 of FIG. 1) accesses a model database 236 (such as the model database 136 of FIG. 1) to obtain virtual models of the overall region and/or the features thereof. The server 220 may also be communicatively coupled to an image database 234 (such as the image database 136 of FIG. 1). The server 220 may then generate the virtual environment 228 in which the virtual model of the overall region is rendered. As described herein, the virtual environment 228 includes a viewing angle. Accordingly, a user electronic device (not depicted) communicative coupled to the server 220 may compare the viewing angle with the location of the virtual model of the overall region to generate the rendering 224. A user may then interact with the virtual environment 228 to view the renderings 224 from different angles and/or zoom levels.

Figure 3:
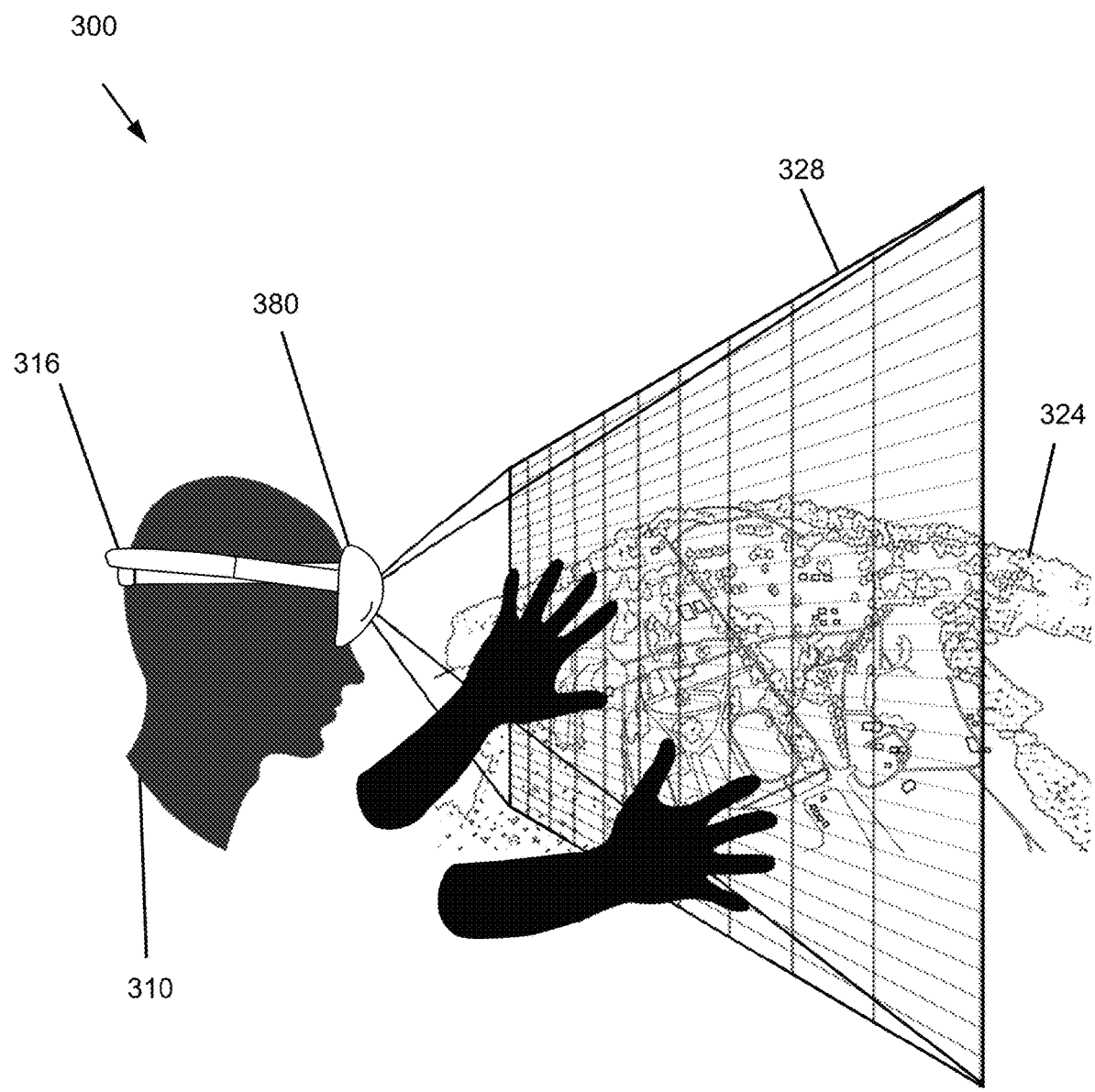
FIG. 3 depicts an example system wherein an exemplary user electronic device is configured to present renderings of a virtual model to a user in a virtual reality environment.

FIG. 3 depicts an example system 300 wherein an exemplary user electronic device 380 is configured to present renderings 324 of the virtual model to a user 310 in a virtual reality environment 328. The user electronic device 380 may be a virtual imaging device configured to be placed in front of the user's eyes, like a pair of goggles or spectacles, and secured by a head gear mechanism 316. As the user 310 views the renderings 324 of the overall region within the virtual environment 328, the user 310 may use hand gestures to manipulate the virtual environment 328. For example, the user 310 may manipulate the virtual environment 328 in order to change the perspective, angle, size, zoom factor, resolution, or other aspects of how the virtual environment 328 is displayed. Additionally or alternatively, the user 310 may use a control device (not depicted) to manipulate the virtual environment 328. Of course, the user 310 may manipulate the virtual reality environment 328 using any known technique.

Figure 4:
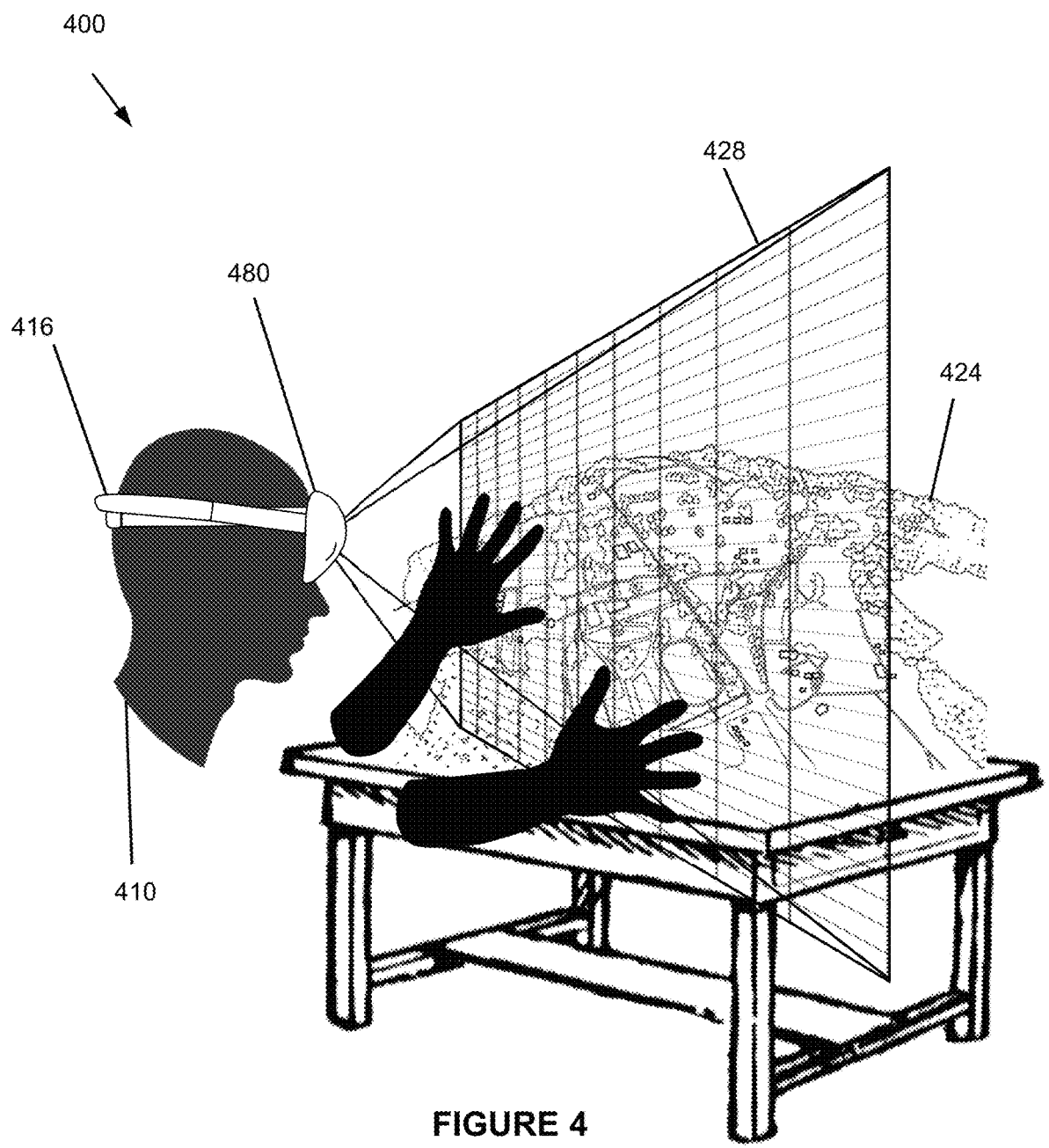
FIG. 4 depicts an example system wherein an exemplary user electronic device is configured to present a rendering of a virtual model to a user in a mixed reality environment.

FIG. 4 depicts an example system 400 wherein an exemplary user electronic device 480 is configured to present a rendering 424 of the virtual model to a user 410 in a mixed reality virtual environment 428. Unlike the user electronic device 380 (as described with respect to FIG. 3), the user electronic device 480 enables to the user 410 to view real objects in addition to the virtual environment 428.

Figure 5:
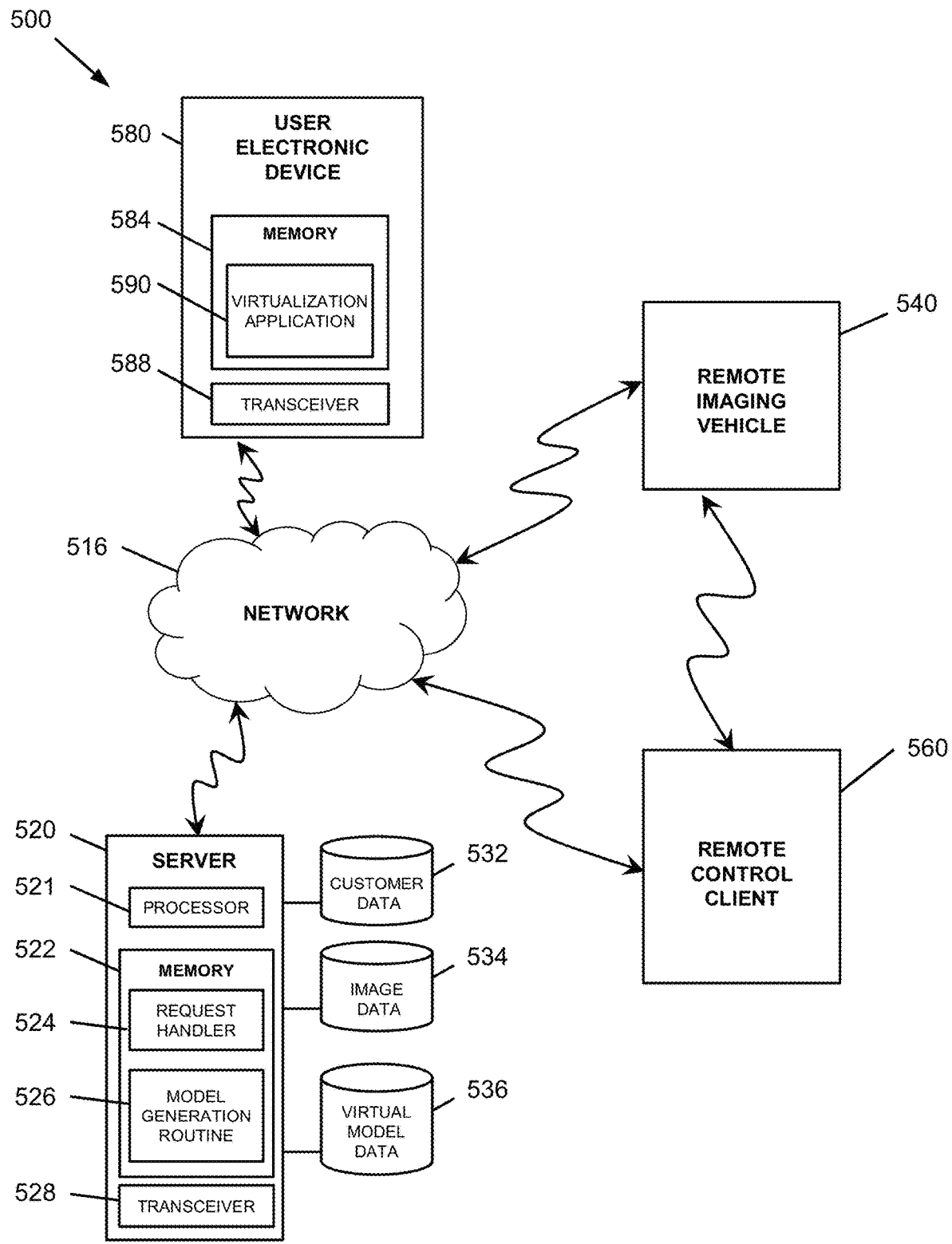
FIG. 5 depicts a block diagram of an exemplary system that may remotely control an imaging vehicle and/or render virtual models.

FIG. 5 depicts a block diagram of an exemplary system 500 that may enable remotely controlling an imaging vehicle 540 and/or render virtual models. As illustrated, the system 500 may include a server 520, the imaging vehicle 540, a remote control client 560, and a user electronic device 580 which communicate with one another via a communication network 516. The communication network 516 may include one or more wired or wireless communication links.

The server 520 may include one or more processors 521 and a memory 522 that stores one or more applications. The one or more processors 521 may interface with the memory 522 to execute the one or more applications. The memory 522 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

One application stored at the memory 522 may be a request handler 524 that processes requests received from the user electronic device 580. For example, the user may request access to customer data stored at a customer database 532, to deploy an emergency services vehicle to a particular location, and/or to dispatch the imaging vehicle 540 to capture a set of image data of an indicated region. Another application stored at the memory 522 may be a model generation routine 526 that generates virtual models based on image data stored at an image database 534, stores the virtual models in a virtual model database 536, and/or generates a virtual environment based on one or more virtual models stored at the virtual model database 536. Although FIG. 5 illustrates that databases 532-536 are separate from the server 520, in some embodiments, the memory 522 locally stores the databases 532-536. It should be appreciated that the memory 522 may store additional applications and/or data.

The server 520 may also include one or more transceivers 528 configured to communicate over the communication network 516. More particularly, the one or more transceivers 528 may be WWAN, WLAN, and/or WPAN transceivers functioning in accordance with IEEE standards, 3GPP standards, or other standards, to receive and transmit data over the communication network 516. In some embodiments, the server 520 may perform the functionalities as discussed herein as part of a "cloud" network, or may otherwise communicate with other hardware or software components within the cloud to send, retrieve, and/or otherwise interact with data.

As illustrated, the server 520 may communicate with the user electronic device 580 via the communication network 516. To this end, the user electronic device 580 may include one or more transceivers 588 configured to communicate over the communication network 516. The user electronic device 580 may also include a memory 584. The memory 584 may include a virtualization application 590 that is executed by one or more processors to display a virtual environment that includes a rendering of one or more of the virtual models that are stored in the model database 536.

As illustrated, the server 520 may also communicate with the remote control client 560 via the communication network 516 to control operation of the remote imaging vehicle 540. To this end, the server 520 may transmit an instruction to the remote control client 560 to dispatch the remote imaging vehicle 540 to capture image date representative of a particular location. Accordingly, in response to receiving the instruction, a remote control client 560 may transmit one or more control commands to the remote imaging vehicle 540 to cause the remote imaging vehicle 540 to capture the request image data. In some embodiments, the server 520 controls the operation of the imaging vehicle 540 directly without the use of the remote control client 560.

Figure 6:
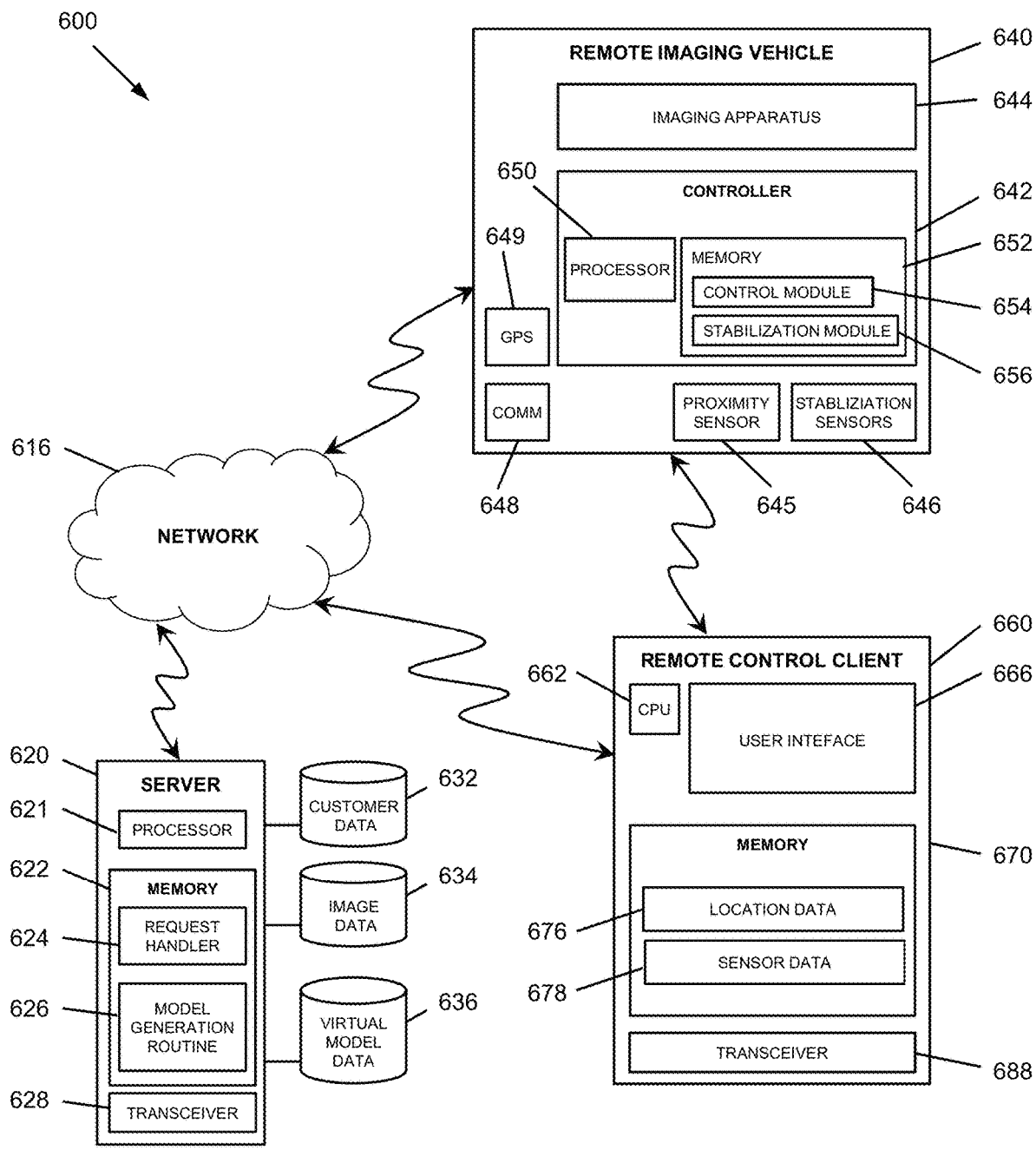
FIG. 6 depicts a block diagram of an exemplary imaging vehicle control system for remotely controlling an imaging vehicle.

FIG. 6 illustrates a block diagram of an exemplary imaging vehicle control system 600 configured to control a remote imaging vehicle 640 (such as the remote imaging vehicle 540 of FIG. 5). The remote imaging vehicle 640 may be controlled by a server 620 (such as the server 520 of FIG. 5) and/or a remote control client 660 (such as the remote control client 560 of FIG. 5). The remote control client 660, the remote imaging vehicle 640, and the server 620 may communicate with each other via a communication network 616 (such as the communication network 516 of FIG. 5). As described with respect to FIG. 5, the server 620 may include one or more processors 621 and a memory 622 that stores a request handler 624 and a model generation routine 626. The server 620 may also include or be connected to one or more databases, such as a customer database 632, an image database 634, and a virtual model database 636. The server 620 may include one or more transceivers 628 configured to communicate over the communication network 616.

The remote control client 660 may be any electronic device, for example, a control or command station computer, a laptop computer, a tablet computer, a smartphone, etc. The remote control client 660 may include one or more processors 662 configured to execute applications stored at a computer-readable memory 670. The memory 670 may be a computer-readable non-transitory storage device that includes persistent (e.g., a hard disk) and/or non-persistent (e.g., RAM) memory components. For example, the memory 670 may store location data 676 and/or sensor data 678.

The remote control client 660 may include the user interface module 666 which may include drivers that support user input devices such as a button, a keyboard, a mouse, a toggle, a joystick, a wheel, or any other input device including those that simulate the appearance of a cockpit. The remote control client 660 may also include one or more transceivers 688 configured to communicate over the communication network 616, for example, to receive commands from the server 620 and/or to control operations of the remote imaging vehicle 640.

The remote imaging vehicle 640 may include a controller 642 that controls operation of one or more proximity sensors 645, one or more stabilization sensors 646, a Global Positioning System (GPS) unit 649, and/or an imaging apparatus 644. The controller 642 may include one or more processors 650 configured to execute instructions stored at a computer-readable memory 652 to control operation of the remote imaging vehicle 640. To this end, the controller 642 may be remotely controlled by one or more commands received from the remote control client 660 and/or the server 620. Accordingly, the remote imaging vehicle 640 may include a communication module 648 including one or more transceivers configured to communicate over the communication network 616, for example, to receive control commands and/or to transmit image data captured by the imaging apparatus 644.

When in operation, the controller 642 may invoke a stabilization module 656 to retrieve data from stabilization sensors 646 (e.g., directional speed sensors, rotational speed sensors, tilt angle sensors, inertial sensors, and/or accelerometer sensors) to control movement of the remote imaging vehicle 640. To this end, the stabilization module may implement one or more control functions that perform PID (proportional-integral-derivative), fuzzy logic, nonlinear, etc. control to maintain the stability of the remote imaging vehicle 640. In response to receiving commands from the server 620 and/or remote control client 660, the controller 642 may analyze data retrieved from these stabilization sensors 646 to control the stability of the remote imaging vehicle 640 as the remote imaging vehicle 640 traverses a path, thereby improving the quality of the image data captured by the imaging apparatus 644.

In some embodiments, the proximity sensors 645 are configured to detect nearby objects, obstructions, etc. that may hinder movement of the remote imaging vehicle 640. These proximity sensors 645 may include any sensors that may assist the control module 654 in determining a distance and a direction to any nearby object. The one or more proximity sensors 645 may include ultrasonic sensors, infrared sensors, LIDAR (Light Detection and Ranging), a stereo vision system (SVS) that may utilize the imaging apparatus 644.

The controller 642 may utilize locationing techniques to ensure that the remote imaging vehicle 640 follows a determined path. To this end, the GPS unit 649 may be configured to implement a positioning protocol, such as "Assisted GPS" (A-GPS), satellite GPS, or any other suitable global positioning protocol or system. For example, A-GPS utilizes terrestrial cell phone towers or Wi-Fi hotspots (e.g., wireless router points) to more accurately and more quickly determine location of the device. On the other hand, satellite GPS generally may be more useful in more remote regions that lack cell towers or Wi-Fi hotspots.

Figure 7:
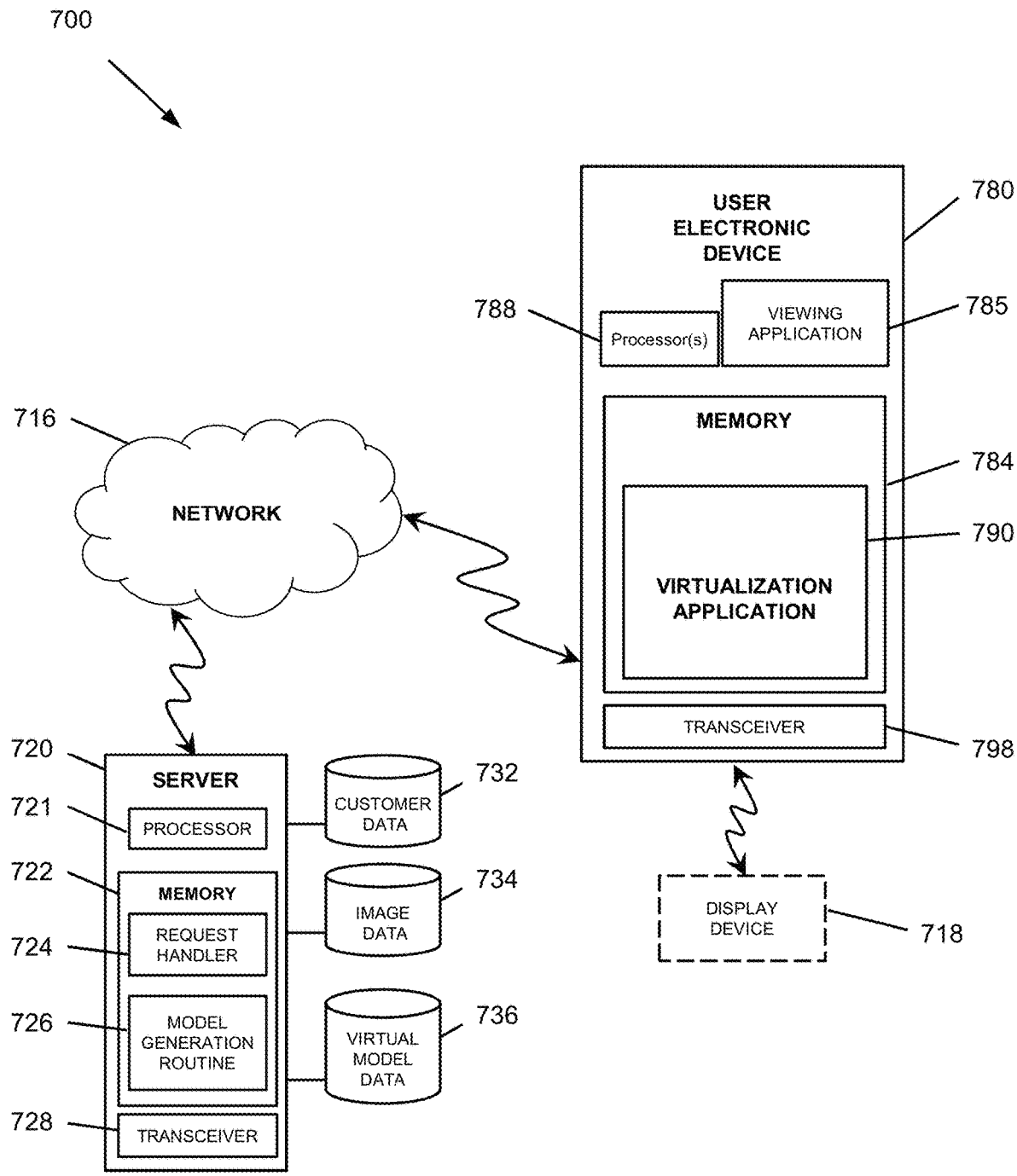
FIG. 7 depicts a block diagram of an exemplary visualization system for viewing virtual environments.

FIG. 7 illustrates a block diagram of an exemplary virtualization system 700 for viewing virtual environments. The visualization system 700 may include a server 720 (such as the server 520 of FIG. 5). As described with respect to FIG. 5, the server 720 may include one or more processors 721 and a memory 722 that stores a request handler 724 and a model generation routine 726. The server 720 may also include or be connected to one or more databases, such as a customer database 732, an image database 734, and a virtual model database 736. The server 720 may include one or more transceivers 728 configured to communicate over a communication network 716 (such as the communication network 516 of FIG. 5), for example, to render a virtual environment for display at a user electronic device 780 and/or a display device 718.

The user electronic device 780 may include one or more processors 788 configured to execute instructions stored at a memory 784. For example, the memory 784 may store a virtualization application 790 configured to present a virtual environment to a user. The processors 788 may include both central processing units (CPUs) and graphical processing units (GPUs). Accordingly, the GPUs may be utilized when performing activities related to rendering the virtual environment and the CPUs may be utilized when performing various other tasks, such as transmitting requests to the server 720.

In some embodiments, the virtualization application 790 presents the virtual environment locally at the user electronic device 780 via a viewing application 785. In other embodiments, the virtualization application 790 presents the virtual environment remotely via the display device 718. In these embodiments, the user electronic device 780 and the display device 718 may communicate over the communication network 716 and/or another communication network adapted for short range communications (such as a Wi-Fi network, a Bluetooth network, etc.). Accordingly, the user electronic device may include one or more transceivers 798 to configured to communicate over the communication network 716 and/or a short range communication network.

Figure 8:
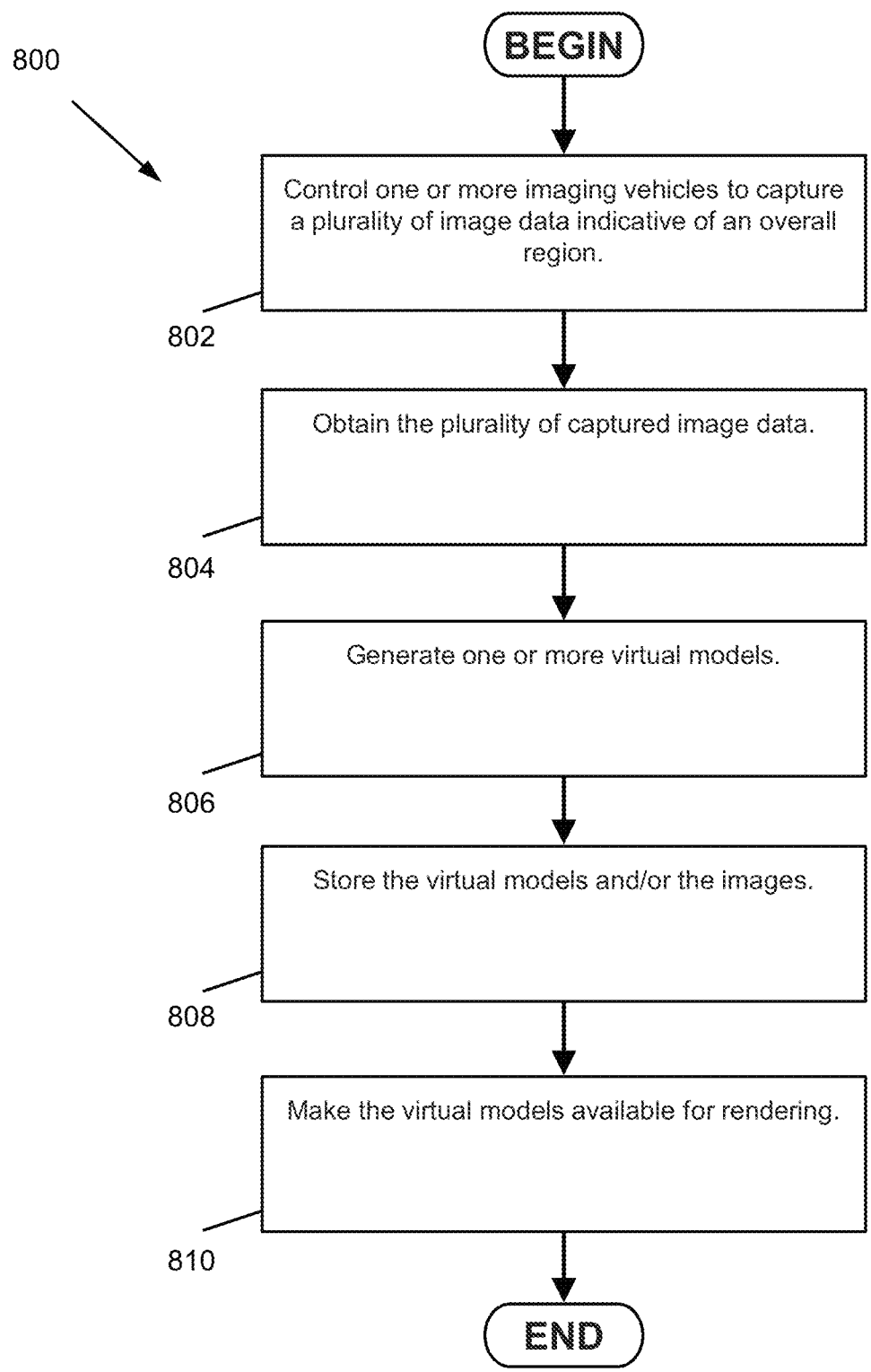
FIG. 8 depicts a flow chart of an example method for generating virtual models.

FIG. 8 depicts a flow chart of an example method 800 for generating virtual models. A server, such as the server 520 of FIG. 5, may perform the method 800. The method 800 may begin when the server controls one or more imaging vehicles (such as the imaging vehicle 540 of FIG. 5) to capture a plurality of image data of an overall region (block 802). To control the imaging vehicle, the server 120 may either transmit commands directly to the imaging vehicle or indirectly via a remote control client (such as the remote control client 560 of FIG. 5). To this end, the server may format the commands in accordance with a control API of the imaging vehicle. For example, the API may enable the server to control the path of the imaging vehicle and/or any of the image capture characteristics. In some scenarios, the command may indicate a target location within the overall region. Accordingly, the API may respond to an input of the target location by generating a series of control commands that navigates the imaging vehicle proximate to the target location.

As the imaging vehicle traverses the path, the imaging vehicle may capture a plurality of image data representative of the overall region. The imaging vehicle may embed the captured with metadata that indicates the location overall region and/or features thereof. For example, the metadata may include physical coordinates of the imaging vehicle, an altitude of the imaging vehicle, pan/tilt/zoom data of the imaging apparatus, a speed of the imaging vehicle, and/or other data that enables the correlation of captured image data to physical coordinates.

The manner in which the imaging vehicle captures the image data may also be controlled by the server. In one example, the server may send a command to capture image data in a sweep mode in which the imaging apparatus of the imaging vehicle is configured to capture image data from a wide angle so as to capture image data of larger portions of the overall region. In another example, the server may send a command to capture image data representative of a target location. In this example, the imaging vehicle may be configured to point the imaging apparatus at the target location from a variety of different angles as the imaging vehicle traverses the path.

In some embodiments, the imaging vehicle stores the captured image data locally until the image vehicle returns to a dock or port. Once arriving at the dock or port, the captured image data may be either transferred via a wired or wireless network servicing the dock or port, or by extracting a physical storage device from the imaging vehicle and inserting the physical storage device into a computing device configured to store captured image data. In other embodiments, to reduce the storage requirements at the imaging vehicle, the imaging vehicle may transmit the image data to a centralized location as the imaging vehicle captures the image data. In any case, the image data captured by the imaging vehicle is stored at an image database (such as the image database 534 of FIG. 5) interconnected to the server.

The server may then obtain the stored image from the image database (block 804). In one example, the server may be configured to automatically detect when new image data is added to the image database. In response, the server may be configured to obtain and process the newly added image data. In another example, a user executes a command that causes the server to obtain and process image data within the image database.

The server may then analyze the obtained image data to generate a virtual model of the overall region and/or the various features thereof (block 806). To this end, the server may input the image data and the corresponding embedded metadata to a model generation routine (such as the model generation routine 526 of FIG. 5). The model generation routine may apply photogrammetry techniques to identify edges, vertices, or surfaces of areas or structures of interest within the image data to segment the overall region into its various features. For example, the model generation routine may identify features across multiple images. Based on the known location and angle from which each image was captured, the model generation routine can utilize triangulation calculations to estimate three dimensional shape of the feature. The model generation routine may then correlate each feature to physical coordinates and/or an address at which each feature is located in the overall region. To generate a model, the model generation routine may analyze the image data to determine the dimensions of the modeled object and create a template three-dimensional object of the same dimensions. After the template object is generated, the model generation routine may generate a mesh for the object that utilizes the obtained image data. In embodiments in which the image data includes thermal or radiation image data, the model generation routine may generate multiple meshes for the same dimension. It should be appreciated that the virtual model for the overall region may be a composite model that includes virtual models for the various features thereof.

After generating the virtual models, the server may then compare the determined coordinates and/or addresses for each virtual model with a customer database, such as the customer database 532 of FIG. 5. If the coordinates and/or address of a virtual model matches coordinates and/or an address of a customer within the customer database, the server may link the virtual model to the customer record. Accordingly, any customer information associated with the feature is integrated into the virtual model.

The server may then store the generated virtual models in a model database, such as the model database 536 of FIG. 5 (block 808). More particularly, the model of overall region and the model of any feature of the overall region are stored at the model database.

By storing the virtual models in the model database, the server makes available the virtual models for use in rendering a virtual environment (block 810). According to aspects, the user electronic device may transmit a request to view a virtual environment that includes the overall region. In some embodiments, the server may transmit the virtual models to a user electronic device to render the virtual environment. In response the server may query the model database and provide any models that match the request. In other embodiments, the server may generate and provide the virtual environment to the user electronic device for rendering.

Figure 9:
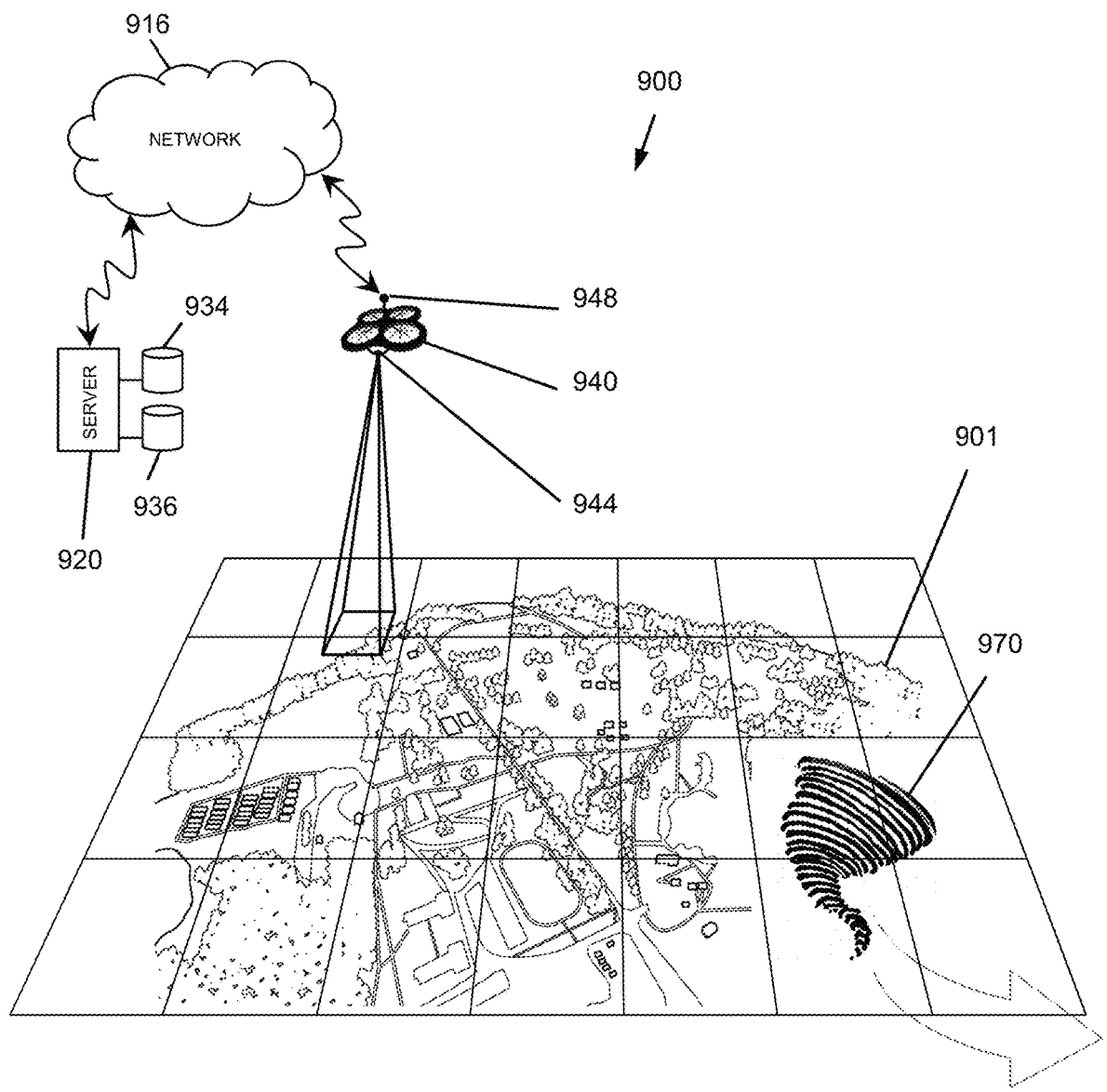
FIG. 9 depicts an example environment wherein an imaging vehicle captures a set of image data representative of an overall region after a disaster (e.g. a tornado) has occurred.

FIG. 9 depicts an example environment 900 wherein one or more exemplary imaging vehicles 940 (such as the imaging vehicle 540 of FIG. 5) captures a set of image data of a overall region 901 after a disaster 970 (e.g. a tornado) has occurred. The imaging vehicle 940 may be an aerial drone equipped with an imaging apparatus 944 configured to capture image data of the overall region 901. The imaging vehicle 940 may also be equipped with a communication apparatus 948 configured to facilitate communications over a wireless network 916 (such as the communication network 516 of FIG. 5). For example, a server 920 (such as the server 520 of FIG. 5) and/or a remote control client (such as the remote control client 560 of FIG. 5) may control travel and/or image capture characteristics by transmitting control commands over the network 916 to the imaging vehicle 940. Additionally, the imaging vehicle 940 may transmit captured image data to the server 920 via the communication network 916. According to aspects, the imaging vehicle 940 embeds the captured image data with metadata such as a time stamp and/or location data.

After receiving the image data, the server 920 may store the image data at an image database 934 (such as the image database 534 of FIG. 5). The server 920 may organize the image database 934 based on the metadata associated with the image data. Accordingly, for example, the image data captured by the imaging vehicle 140 of FIG. 1 prior to the disaster 970 occurring can be stored separately from the image data captured by the imaging vehicle 940 after the disaster 970 occurred.

The server 920 may then convert the image data captured by imaging vehicle 940 into virtual models of the overall region 910 and/or features thereof. The server 940 may then store the virtual models at a model database 936 (such as the model database 536 of FIG. 5). The server 920 may organize the model database 936 based on the embedded metadata. To this end, the server 920 may determine that embedded location data of a virtual model generated based on the image data captured by the imaging vehicle 940 is located at a same or similar location as a virtual model already stored in the model database 936. Accordingly, the server 920 may determine that the newly generated virtual model is an updated version of the currently stored virtual model.

Figure 10:
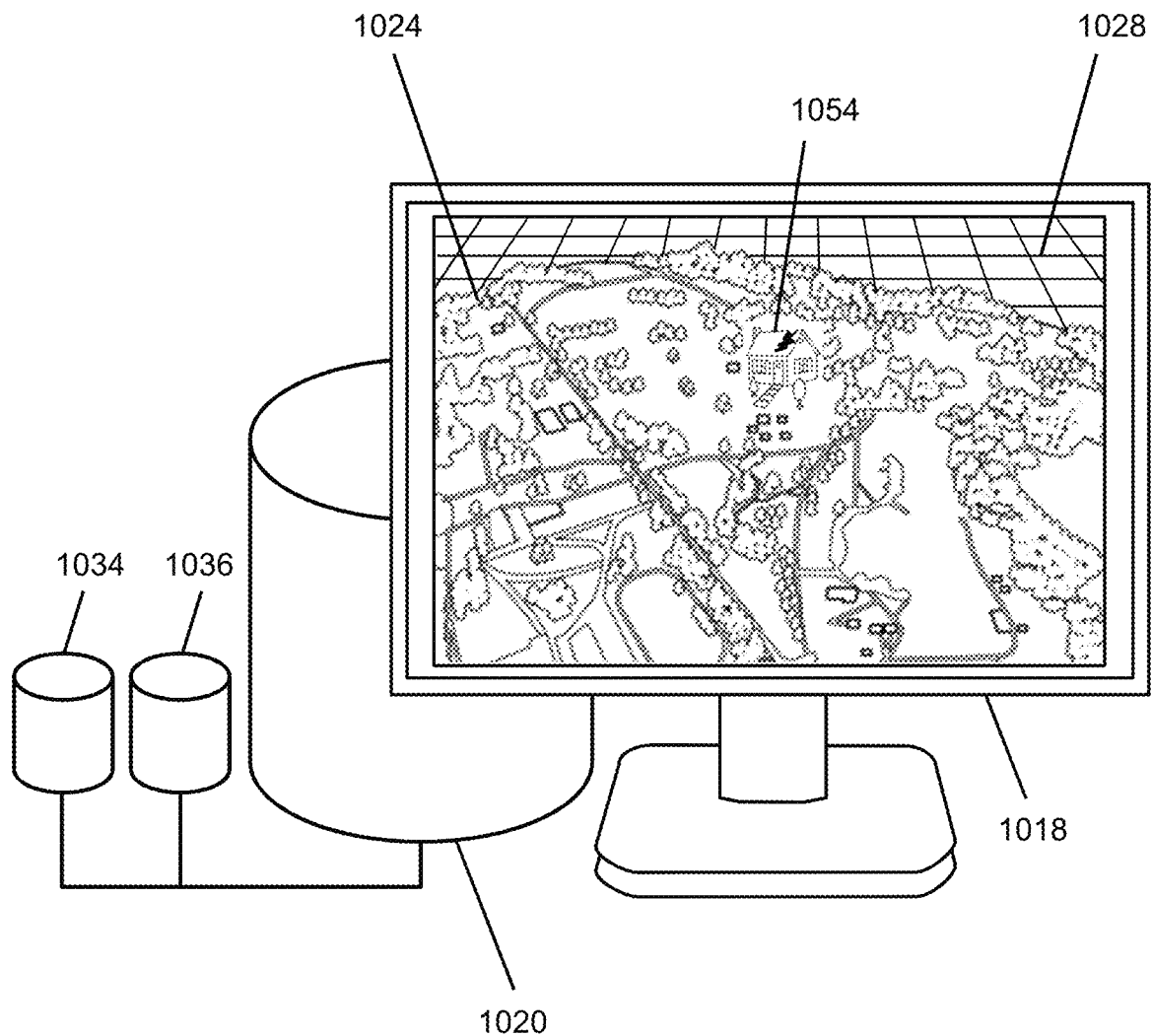
FIG. 10 depicts an exemplary virtual model of an overall region within a virtual environment.

FIG. 10 depicts a rendering 1024 of an exemplary virtual model of an overall region (such as the overall region 901 of FIG. 9) within a virtual environment 1028. As illustrated, the virtual environment 1028 is displayed on an exemplary display unit 1018. The virtual environment 1028 may include one or more models of features 1054 that have been damaged by a disaster. In the illustrated embodiment, a server 1020 (such as the server 520 of FIG. 5) may access a model database 1036 (such as the model database 536 of FIG. 5) to obtain the virtual models of the features 1054. Accordingly, the server 1020 may generate the virtual model of feature 1054 based on updated image data stored at an image database 1034 (such as the image database 534 of FIG. 5).

Figure 11:
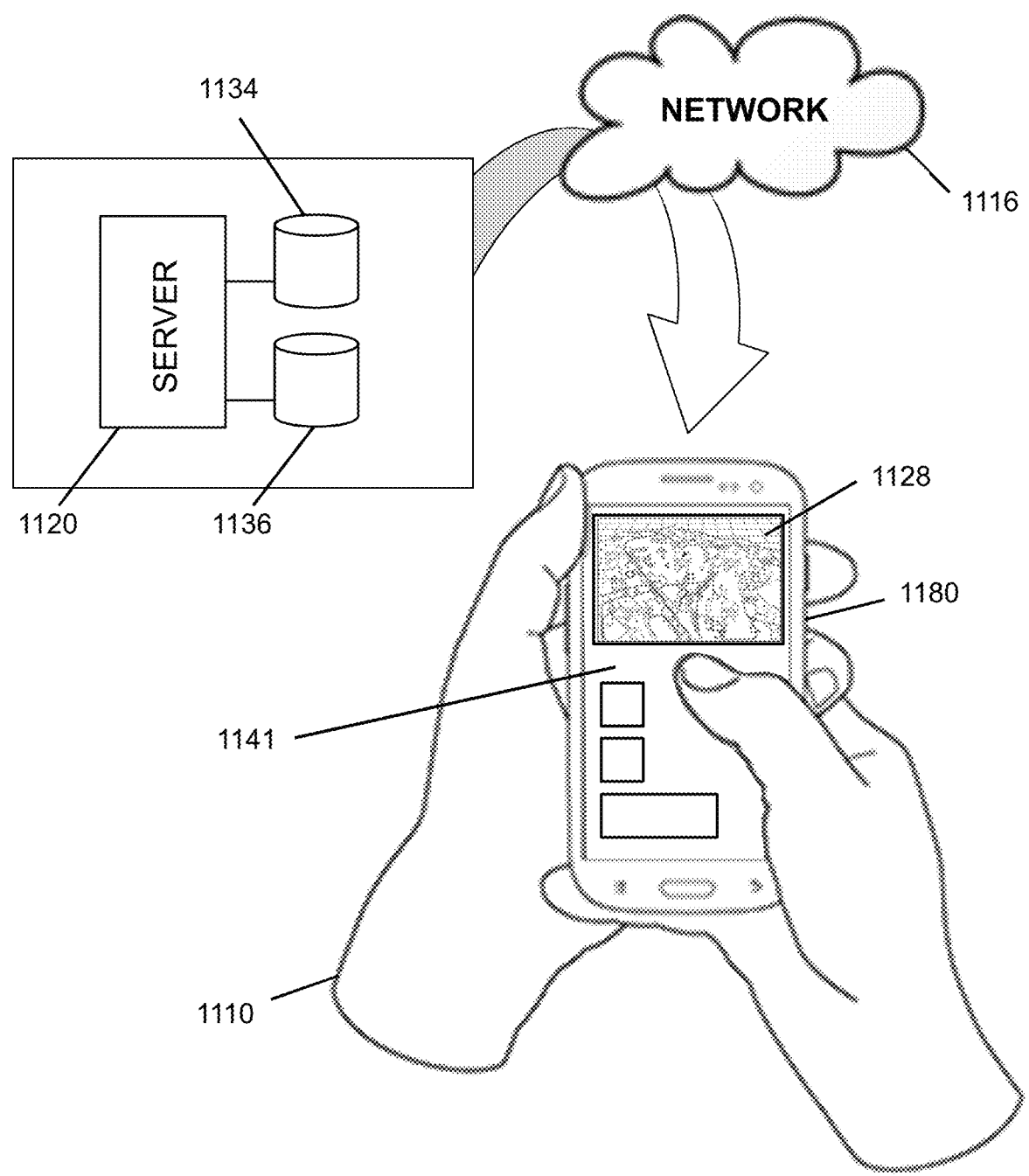
FIG. 11 depicts a user electronic device displaying a virtual environment in which a virtual model of an overall region is rendered.

FIG. 11 depicts a user electronic device 1180 (such as the user electronic device 580 of FIG. 5) displaying, on a graphical user interface 1141, a virtual environment 1128 in which a virtual model of an overall region is rendered. The user electronic device 1180 may communicate over a network 1116 (such as the communication network 516 of FIG. 5) with a server 1120 (such as the server 520 of FIG. 5) to obtain and render the model of the overall region and/or models of the various features therein. As described herein, the virtual models may be stored at a model database 1136 (such as the model database 536 of FIG. 5) and the image data underlying the virtual models may be stored at an image database 1134 (such as the image database 534 of FIG. 5). The user 1110 may interact with the graphical user interface 1141 to manipulate the virtual environment 1128 and/or the viewing angle.

Figure 12:
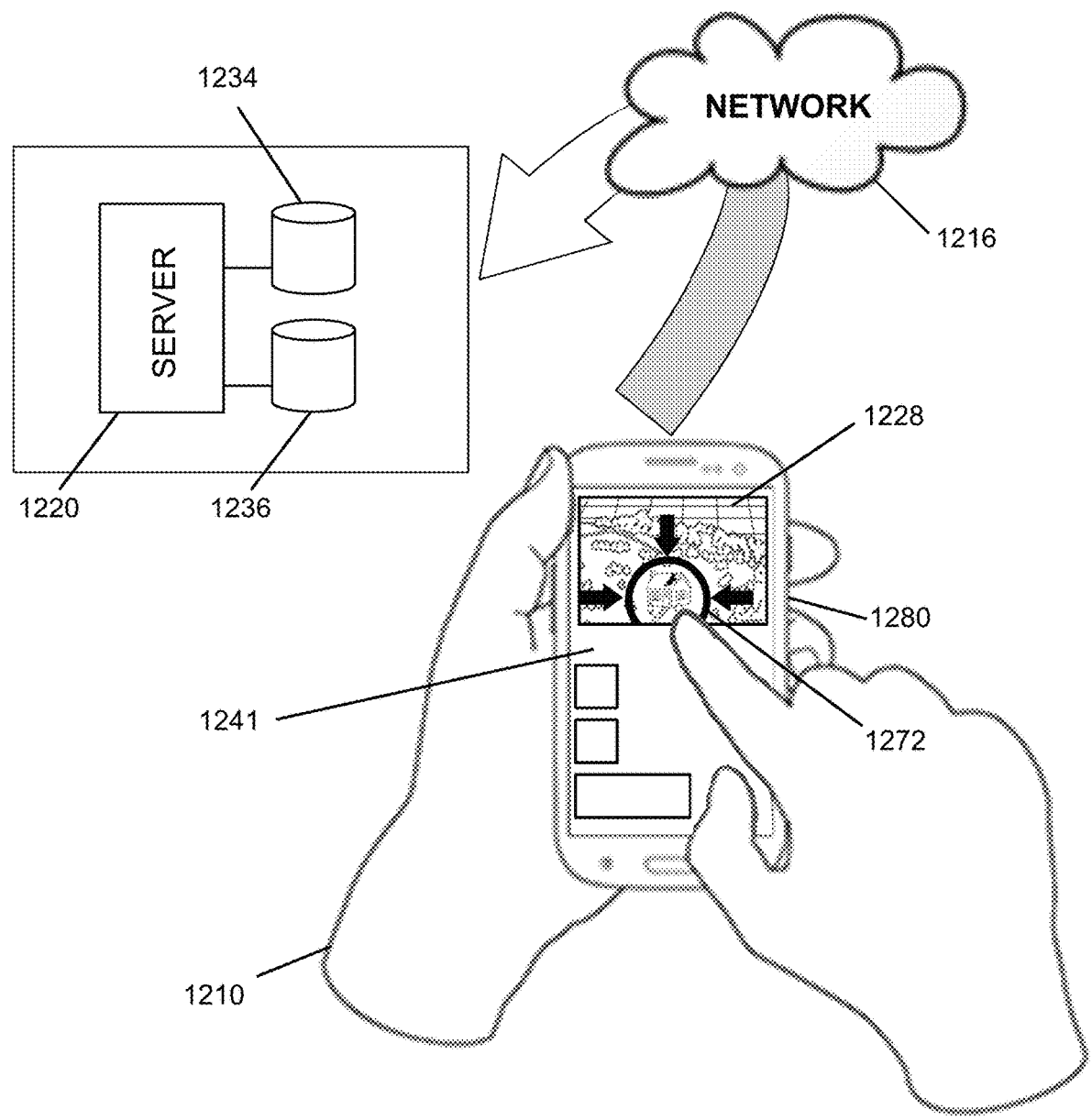
FIG. 12 depicts a user interaction on a user electronic device to identify a structure within a virtual environment.

FIG. 12 depicts a user interaction on a user electronic device 1280 (such as the user electronic device 580 of FIG. 5) to indicate a particular feature 1272 within a virtual environment 1228. In the illustrated scenario, the user interaction is when a user 1210 touches a graphical user interface 1241 at a location at which the indicated feature 1272 is displayed. Of course, other user interactions to indicate the particular feature 1272 are envisioned. For example, the user 1210 may use voice commands, navigate a menu of structures, enter a term into a search box, and so on. In response to the user 1210 indicating the particular feature 1272, the user electronic device 1280 may present an overlay that enables the user 1210 to view information associated with the indicated feature 1272 and/or perform one or more interactions associated with the indicated feature 1272.

According to certain aspects, the virtual environment 1228 is associated with a virtual coordinate system that defines the locations of various features within the virtual environment. In some embodiments, the virtual coordinate system may be defined to mimic a coordinate system of the real world. For example, the virtual environment 1228 may assign a feature a virtual coordinate that is the same as the GPS coordinate at which the feature is physically located. In other embodiments, the user electronic device 1280 and/or a server 1220 (such as the server 520 of FIG. 5) must convert the virtual coordinate to a geographic coordinate, such as when the virtual coordinate system is an x, y, z coordinate system defined about an origin. In either case, when the user 1210 indicates the particular feature 1272, the user electronic device 1280 may transmit a coordinate (either virtual or geographic) to the server 1220 via a network 1216 (such as the communication network 516 of FIG. 5). As illustrated, the server 1220 may be communicatively connected to an image database 1234 (such as the image database 534 of FIG. 5) and a virtual model database 1236 (such as the model database 536 of FIG. 5).

Figure 13:
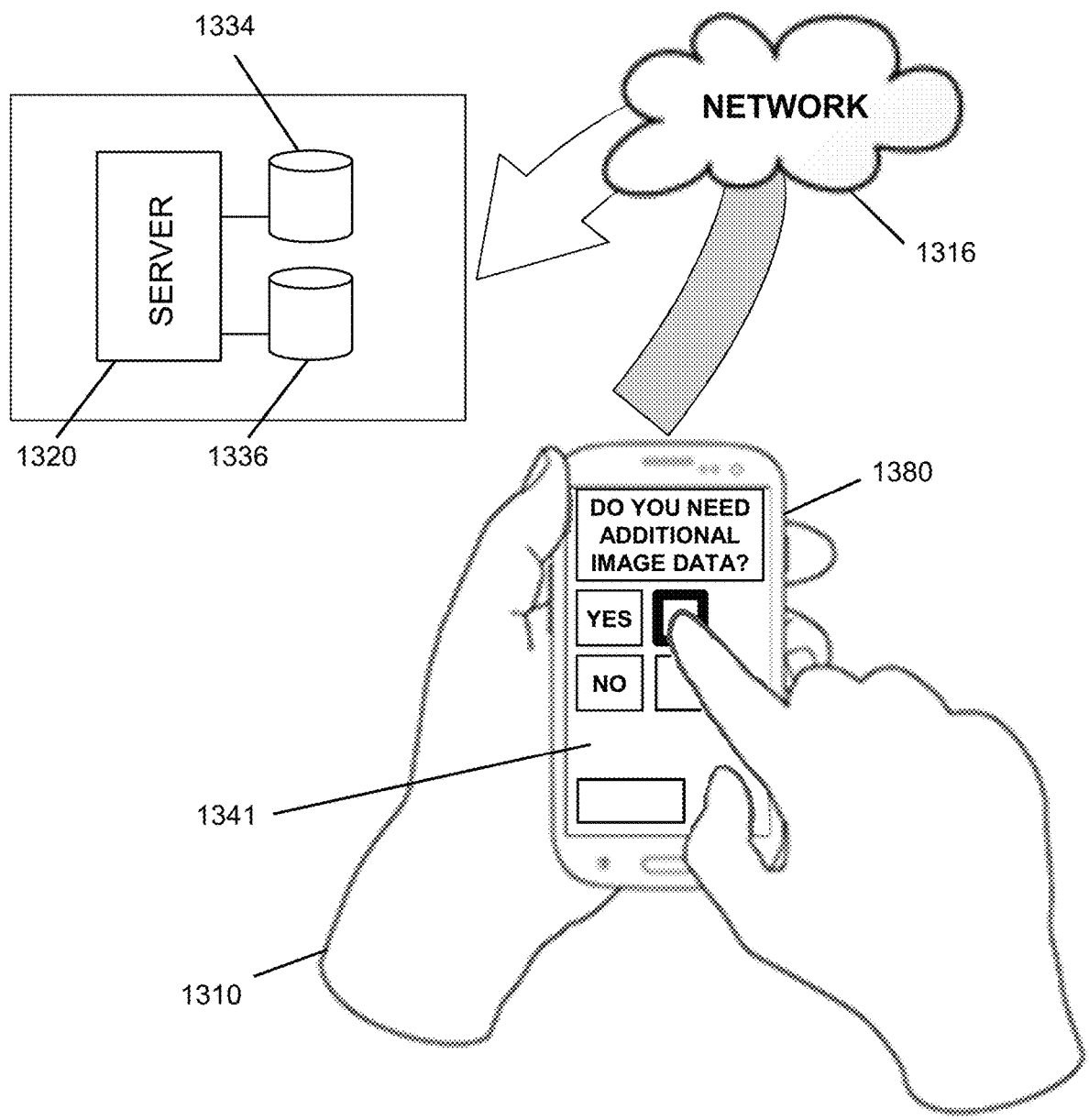
FIG. 13 depicts a user interaction on a user electronic device to send a request to capture additional image data of an indicated feature.

FIG. 13 depicts a user interaction on a user electronic device 1380 (such as the user electronic device 580 of FIG. 5) to send a request to capture additional image data of an indicated feature, such as the particular feature 1272 of FIG. 12. In the illustrated scenario, the user interaction is when a user 1310 selects a "YES" box displayed on a graphical user interface 1341 of the user electronic device 1380. The graphical user interface 1341 may be presented in response to the user 1210 of FIG. 12 indicating the particular feature 1272. Of course, other known user interface techniques may be used to detect a user interaction to send a request to capture additional image data.

In response to the user 1310 indicating the request via the graphical user interface 1341, the user electronic device 1380 may transmit a request to a server 1320 (such as the server 520 of FIG. 5) via a network 1316 (such as the communication network 516 of FIG. 5). The request may include one or more coordinates (either virtual or geographic) associated with the indicated feature. The request may also include other parameters that control characteristics of the image capture process. For example, the request may include a capture mode (fly by or close proximity), a minimum resolution, a sample rate, a priority level, and so on. As illustrated, the server 1320 may be communicatively connected to an image database 1334 (such as the image database 534 of FIG. 5) and a virtual model database 1336 (such as the model database 536 of FIG. 5).

Figure 14:
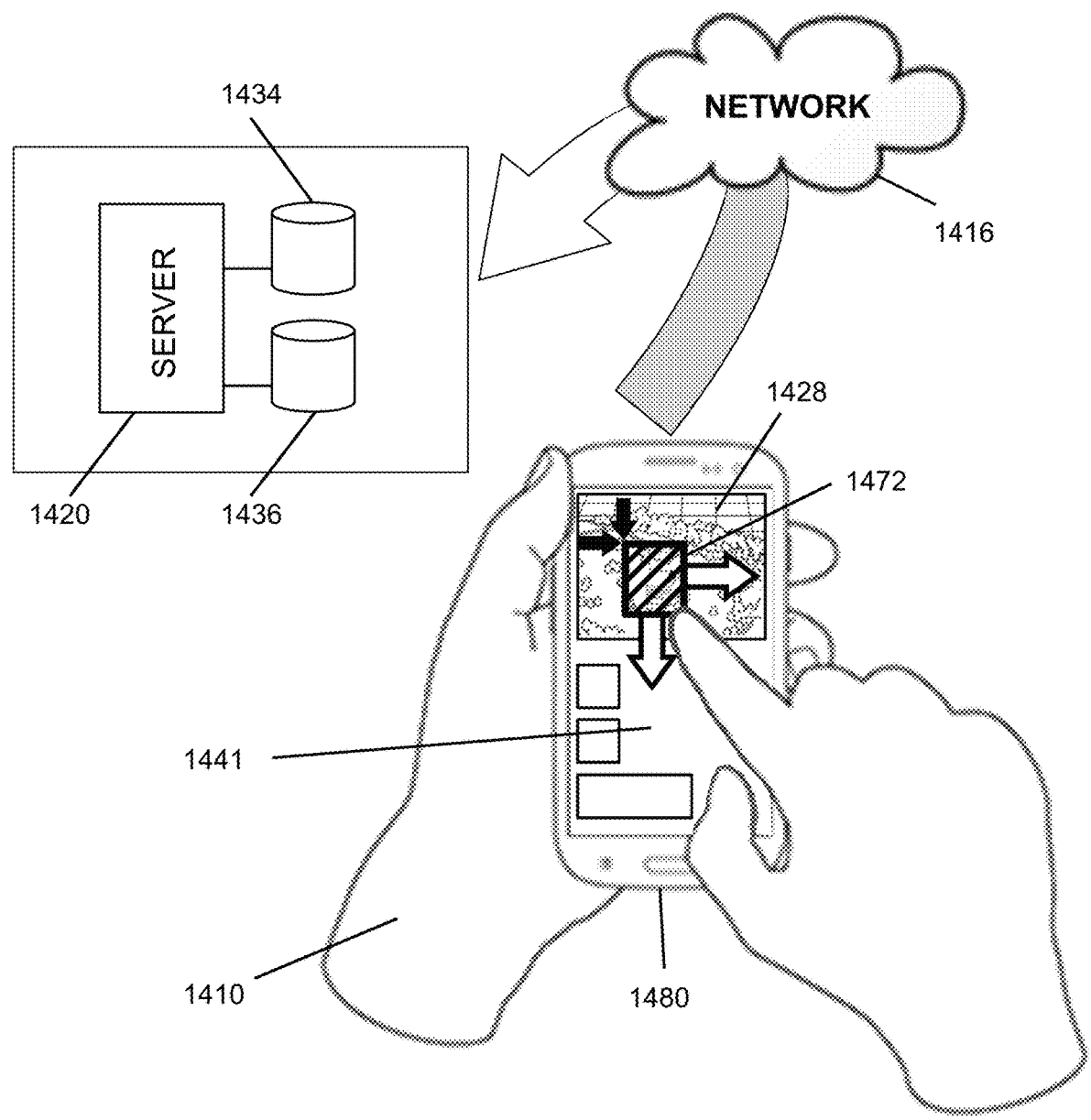
FIG. 14 depicts a user interaction on a user electronic device to indicate a region of interest.

FIG. 14 depicts a user interaction on a user electronic device 1480 (such as the user electronic device 580 of FIG. 5) to indicate a region of interest 1472. A user 1410 may interact with a graphical user interface 1441 of the user electronic device 1480 to select the region of interest 1472, for example, by dragging her finger across the screen, by tapping at several points that define a region, by selecting multiple features to define a region that includes the selected features, and/or any other technique for selecting the region of interest 1472 within a virtual environment 1428. Similar to when the user 1210 identified a particular feature within the virtual environment 1228 of FIG. 12, the user electronic device 1480 may transmit an indication of the region of interest 1472 to a server 1420 (such as the server 520 of FIG. 5) via a network 1416 (such as the communication network 516 of FIG. 5). However, instead of transmitting an indication of a single coordinate indicative of a location of an identified structure, the user electronic device 1480 may transmit a range of coordinates that define the region of interest 1472 and/or a coordinate indicative of the center of the region of interest 1472. As illustrated, the server 1420 may be communicatively connected to an image database 1434 (such as the image database 534 of FIG. 5) and a virtual model database 1436 (such as the model database 536 of FIG. 5).

Figure 15:
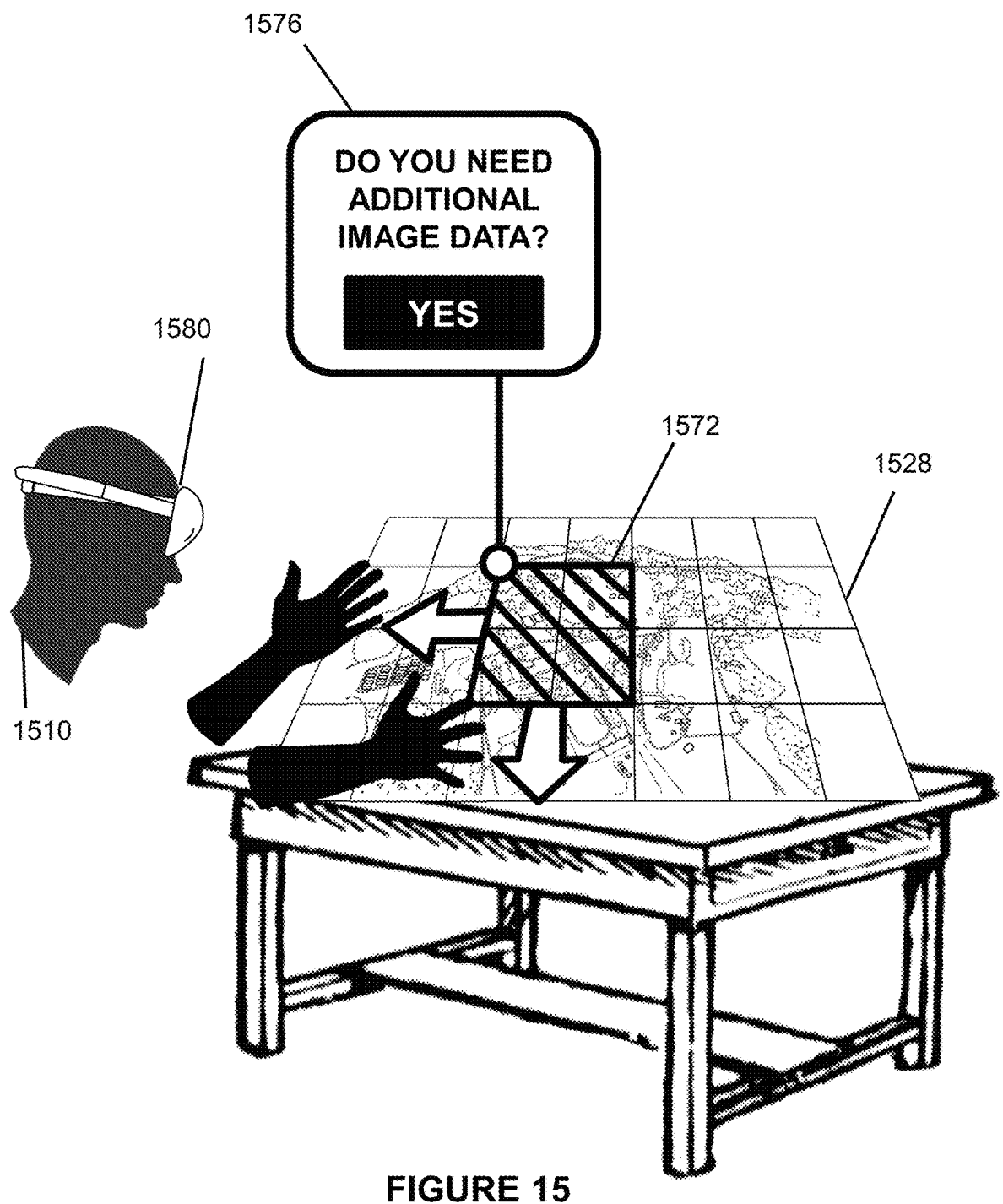
FIG. 15 depicts a user interaction via a user electronic device to indicate a region of interest within a virtual environment.

FIG. 15 depicts a user interaction via a user electronic device 1580 to indicate a region of interest 1572 within a virtual environment 1528. Unlike the user interactions described with respect to FIGS. 12-14, the user electronic device 1580 is a mixed-reality imaging device. To indicate the region of interest 1572, the user 1510 may use hand gestures and/or a control device (not depicted). For example, when the user 1510 moves her hands apart from one another, the user electronic device 1580 may interpret the gesture as selecting a region that is between the hands of the user 1510. As another example, the user 1510 may virtually trace a boundary line that defines a region. Of course, other techniques to select the region of interest 1572 within the virtual environment 1528 are envisioned.

In the illustrated example, the virtual environment 1528 may include a pin or some other indicator at the region of interest 1572. When the user 1510 interacts with the pin, the user electronic device 1580 may render an overlay 1576 with which the user 1510 may interact. For example, the additional information may include indications of data stored at the customer database 532 of FIG. 5 and/or provide a prompt to perform an various actions associated with the region of interest 1572. As illustrated, the overlay 1576 enables the user 1510 to obtain a higher resolution model of the region of interest 1572. Accordingly, when the user 1510 selects the prompt within the overlay 1576, the server may initiate the process of integrating a higher resolution virtual model of the region of interest 1572 with the virtual environment 1528.

Figure 16:
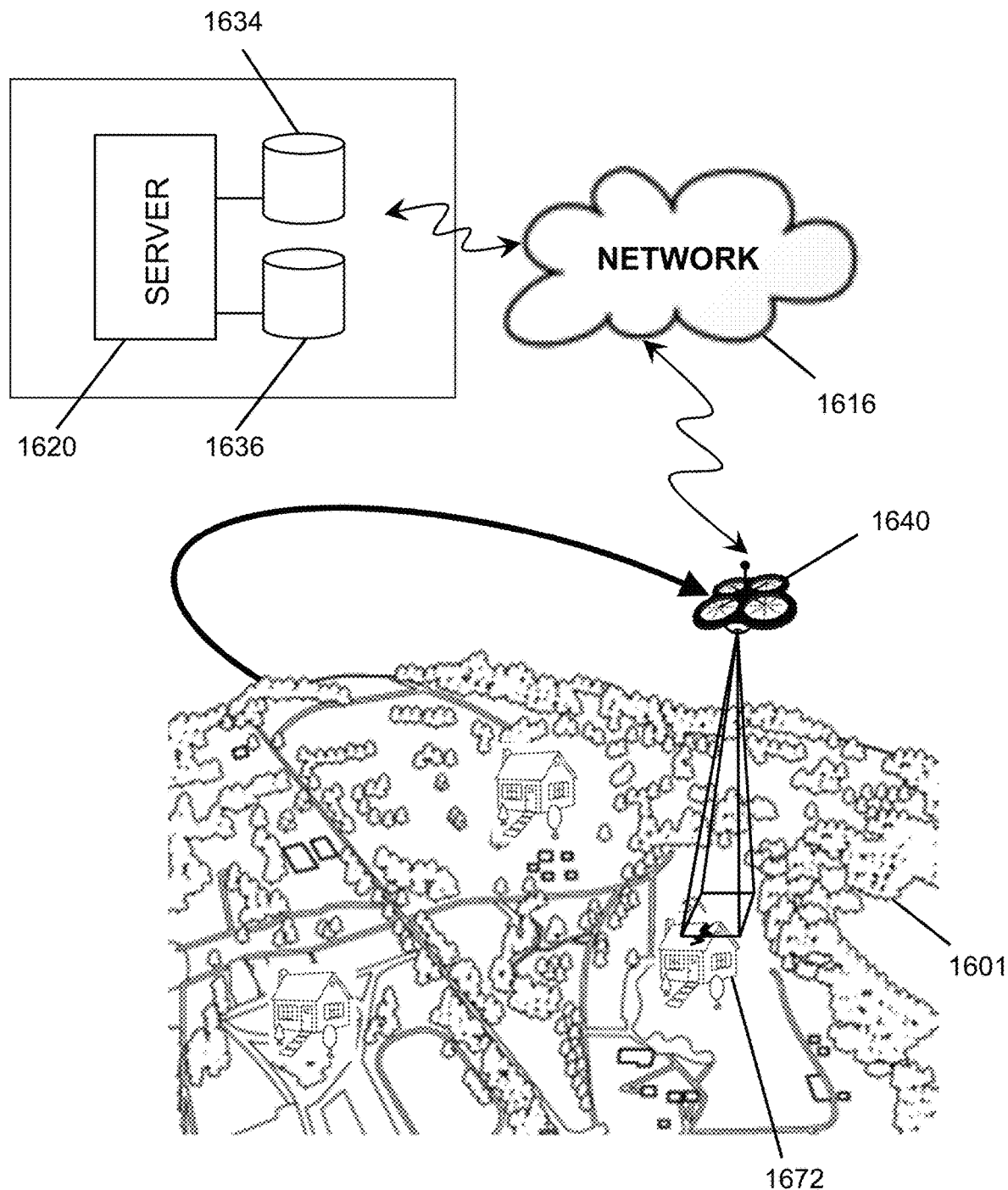
FIG. 16 depicts an imaging vehicle being dispatched to capture a set of image data representative of an indicated area within an overall region.

FIG. 16 depicts an imaging vehicle 1640 (such as the imaging vehicle 540 of FIG. 5) being dispatched to capture a set of image data representative of an indicated area 1672 within an overall region 1601. For example, a server 1620 (such as the server 520 of FIG. 5) may dispatch the imaging vehicle 1640 in response to receiving a request to capture additional image data. As described herein, the request may include coordinate(s) associated with the indicated area 1672 within the overall region 1601 (e.g., an indicated feature or a region of interest). If the request includes virtual coordinates for the indicated region 1672 based on a coordinate system defined by a virtual environment, the server 1620 may convert the virtual coordinates to geographic coordinates.

In some embodiments, the server 1620 may directly communicate with the imaging vehicle 1640 via a network 1616 (such as the communication network 516 of FIG. 5) to cause the imaging vehicle 1640 to capture the requested image data. In these embodiments, the server 1620 may generate a travel path that causes the imaging vehicle 1640 to traverse the overall region 1601 to capture image data representative of the indicated area 1672. In some implementations, the server 1620 may the actively control operation of the imaging vehicle 1640 to cause the imaging vehicle to follow travel path. In other implementations, the server 1640 may transmit the travel path to the imaging vehicle 1640 and the imaging vehicle 1640 is configured to autonomously traverse the travel path.

In other embodiments, the server 1620 may communicate with a remote control client (such as the remote control client 560 of FIG. 5) to control operation of the imaging vehicle 1640. In these embodiments, the server 1620 may transmit the geographic coordinates to the remote control client which, in turn, generates a travel path. When the remote control client includes a pilot and/or command station, the remote control client may display the flight path on a display screen for a pilot to remotely control the imaging vehicle 1640. Additionally or alternatively, the remote control client may automatically transmit commands to the imaging vehicle 1640 to cause the imaging vehicle 1640 to follow the travel path. As illustrated, the server 1620 may be communicatively connected to an image database 1634 (such as the image database 534 of FIG. 5) and a virtual model database 1636 (such as the model database 536 of FIG. 5).

Figure 17:
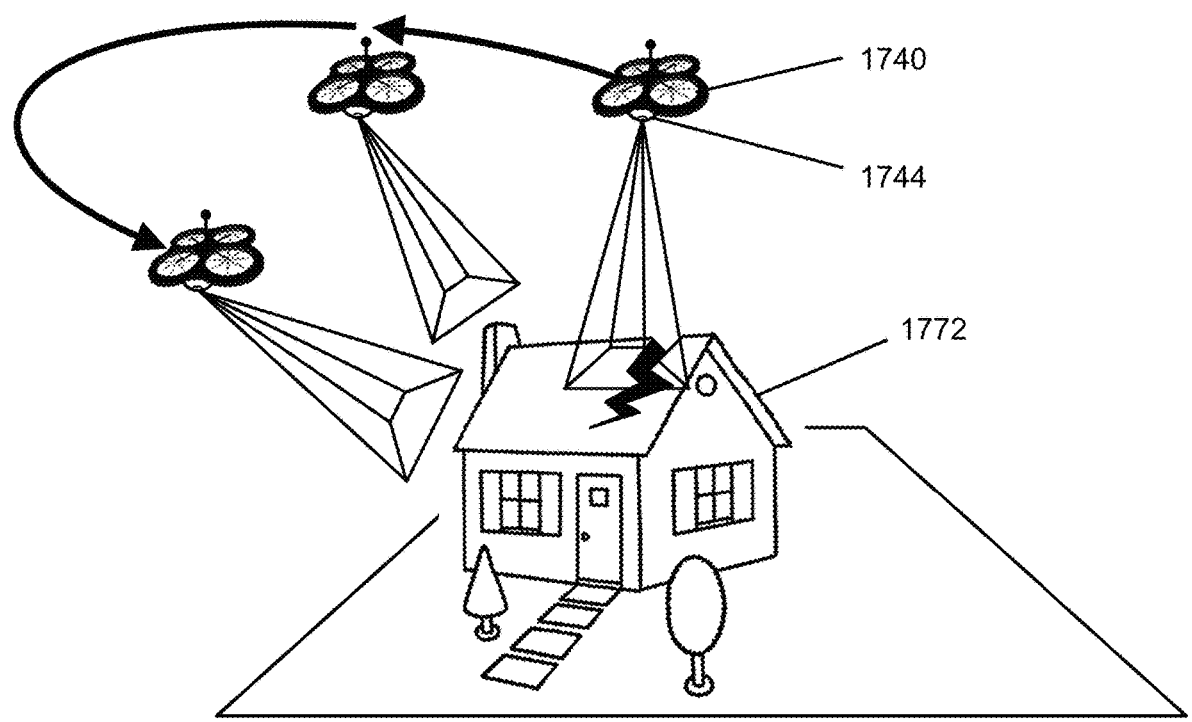
FIG. 17 depicts an imaging vehicle capturing a set of image data representative of an indicated area within an overall region that is a particular feature.

FIG. 17 depicts an imaging vehicle 1740 (such as the imaging vehicle 540 of FIG. 5) capturing a set of image data representative of an indicated area 1772 that is a particular feature. In the illustrated example, the imaging vehicle 1740 is an aerial drone that is equipped with an imaging apparatus 1744 (such as the imaging apparatus 544 of FIG. 5) configured to capture image data representative of the indicated area 1772.

In some embodiments, when the indicated area 1772 is a feature (such as a structure), the imaging vehicle 1740 may be configured to image data of the structure from one or more positions proximate to the feature. For example, the imaging vehicle 1740 may hover above the feature with the imaging apparatus 1744 pointing generally downwards and traverse the feature at a particular height in a grid pattern while capturing image data at configured intervals. As the imaging vehicle 1740 traverses the feature, the imaging apparatus 1744 may rotate orientations so as to capture image data indicative of the feature from different angles and/or altitudes.

Figure 18:
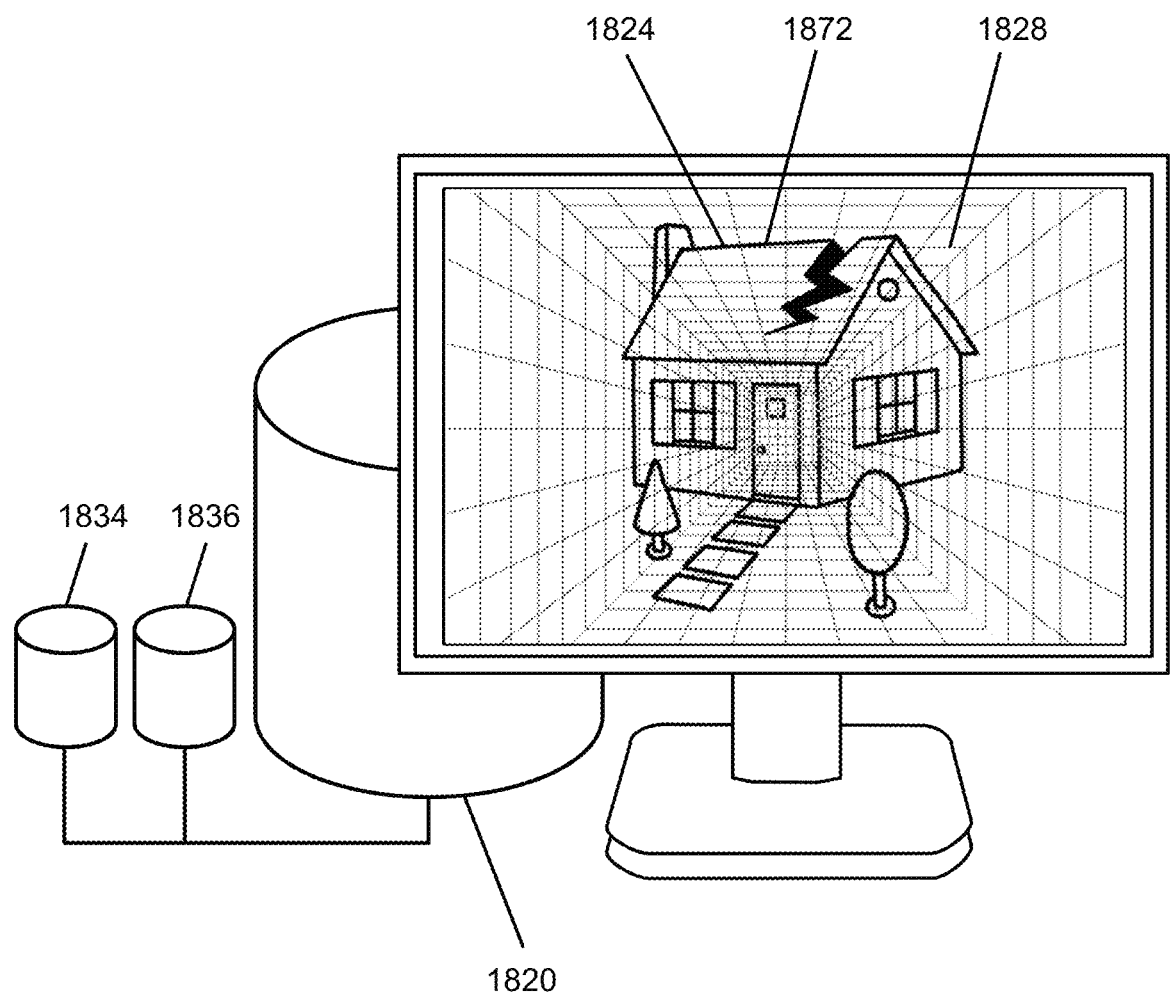
FIG. 18 depicts a rendered virtual model of an indicated region, such as a damaged structure, within a virtual environment.

FIG. 18 depicts a rendered virtual model 1824 of an indicated area 1872, such as a damaged structure, within a virtual environment 1828. To this end, after an imaging vehicle captures image data representative of the indicated area 1872, a server 1820 (such as the server 520 of FIG. 5) may store the captured image data at an image database 1834 (such as the image database 534 of FIG. 5). Subsequently, the server 1820 may obtain the image data stored in the image database 1834 to generate a virtual model of the indicated area 1872. As described herein, the server 1820 may store the virtual model 1802 of the indicated area 1872 at a model database 1836 (such as the model database 536 of FIG. 5). It should be appreciated that due to the imaging vehicle being configured to capture image data specifically of the indicated area 1872, the resulting virtual model of the indicated area 1872 is a higher resolution model than the virtual models of the indicated area 1872 previously stored at the model database 1836.

Figure 19:
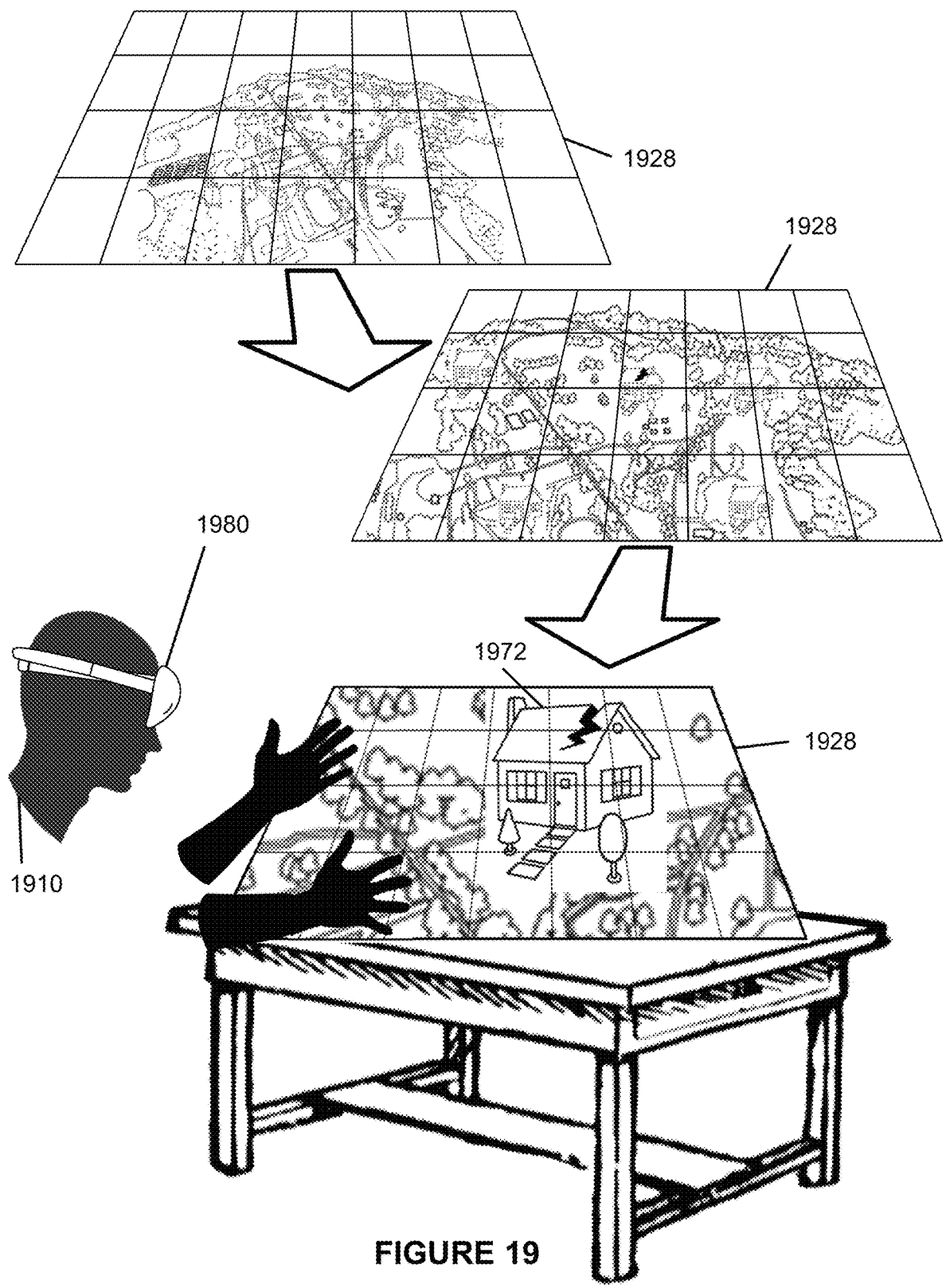
FIG. 19 depicts a rendered virtual model of an overall region at several zoom levels.

FIG. 19 depicts a virtual environment 1928 at several zoom levels. The virtual environment 1928 may be displayed by a user electronic device 1980 (such as the user electronic device 580 of FIG. 5) may include a rendering of the virtual model of an overall region that includes virtual models of the various features thereof. As described herein, a user 1910 may manipulate the virtual environment 1928 by zooming into different regions of the virtual environment 1928. Accordingly, as the user 1910 zooms in and out on the virtual environment 1928, the user electronic device 1980 is required to update the rendering of the virtual model to reflect the appropriate zoom level. In some embodiments, when the user 1910 alters the zoom level, the user electronic device 1980 may transmit an indication of the altered zoom level to a server (such as the server 520 of FIG. 5).

In some scenarios, the user electronic device 1980 may determine that the virtual environment 1928 includes sufficient information in the rendering of the virtual model for the overall region to be presented at the higher resolutions associated with closer zoom levels. For example, when the user 1910 zooms the virtual environment 1928 from the uppermost zoom level to the middle zoom level, the user electronic device 1980 does not need to access an additional, higher-resolution model of the overall region. However, when the user 1910 zooms from the middle zoom level to the lowermost zoom level, the user electronic device 1980 may determine whether higher resolution models 1972 of features within the viewing angle are available. If the higher resolution models 1972 are available, the user electronic device 1980 renders the higher resolution models 1972 at the location in the virtual environment 1928 corresponding to the virtual coordinates for the feature in the rendering of the virtual model of the overall region. As a result, the higher resolution models 1972 are integrated into the same virtual environment as the rendering of the virtual model of the overall region.

Figure 20:
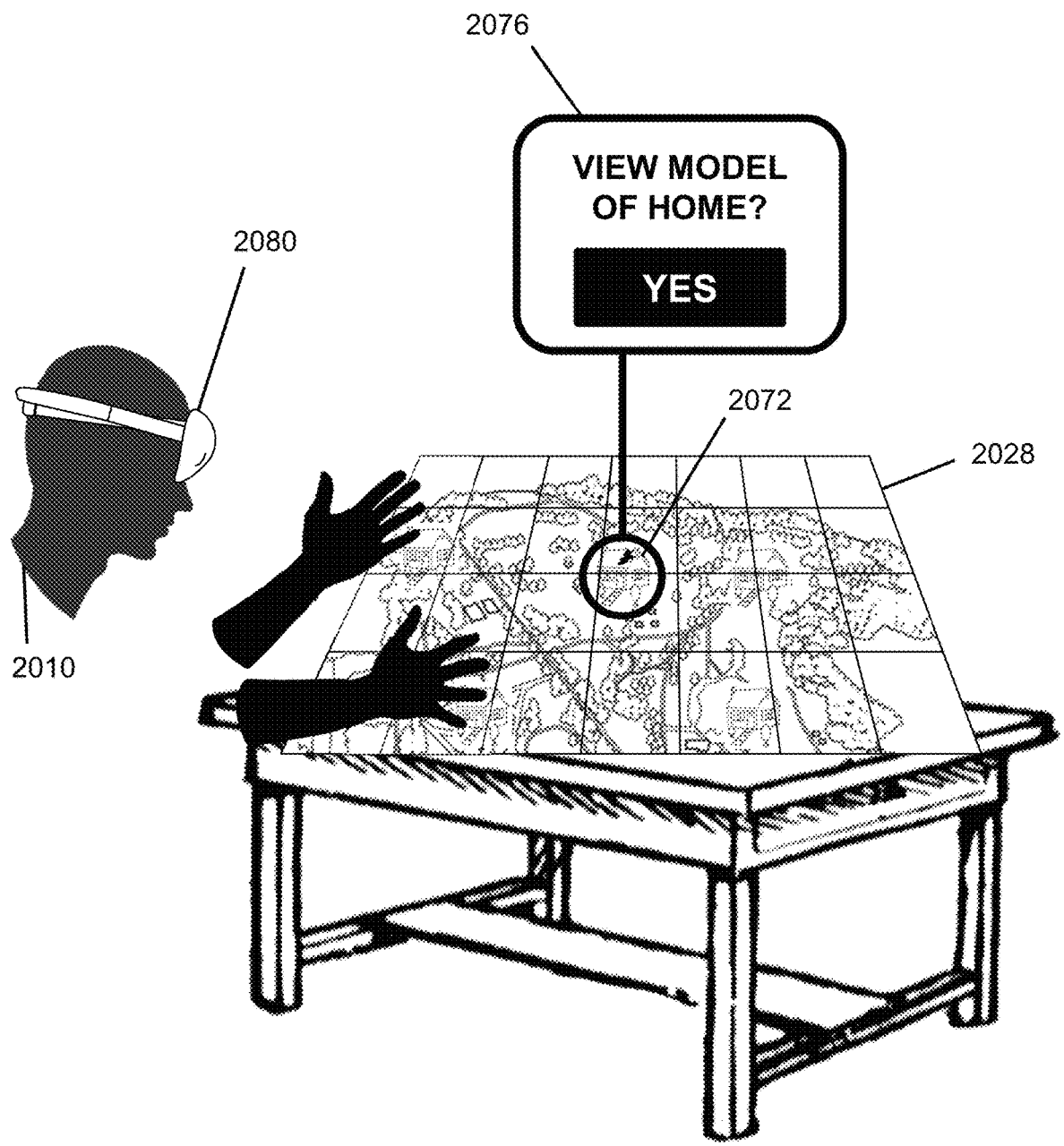
FIG. 20 depicts a user interaction with a virtual environment to view a rendering of a virtual model of a feature of a virtual model in a new virtual environment.

FIG. 20 depicts a user interaction with a virtual environment 2028 to view, via a user electronic device 2080 (such as the user electronic device 580 of FIG. 5), a rendering of a virtual model of a particular feature 2072 of an overall region in a new virtual environment. To this end, the user 2010 may manipulate the virtual environment 2028 to select the feature 2072. In some embodiments, the virtual environment 2028 may include a pin or some other indicator at features that are associated with additional data and/or higher resolution models. When the user 2010 interacts with the pin, the user electronic device 2080 may render an overlay 2076 with which the user 2010 interacts. In some embodiments, the user electronic device 2080 communicates with a sever (such as the server 520 of FIG. 5) to populate the overlay with data. As illustrated, the overlay 2076 may include a prompt that functions as a link to enable the user 2010 to view a higher resolution model of the feature 2072 in its own virtual environment. Accordingly, when the user 2010 selects the prompt, the user electronic device 2080 may cease rendering the virtual environment 2028 and begin rendering a new virtual environment that only contains the virtual model of the feature 2072.

Figure 21:
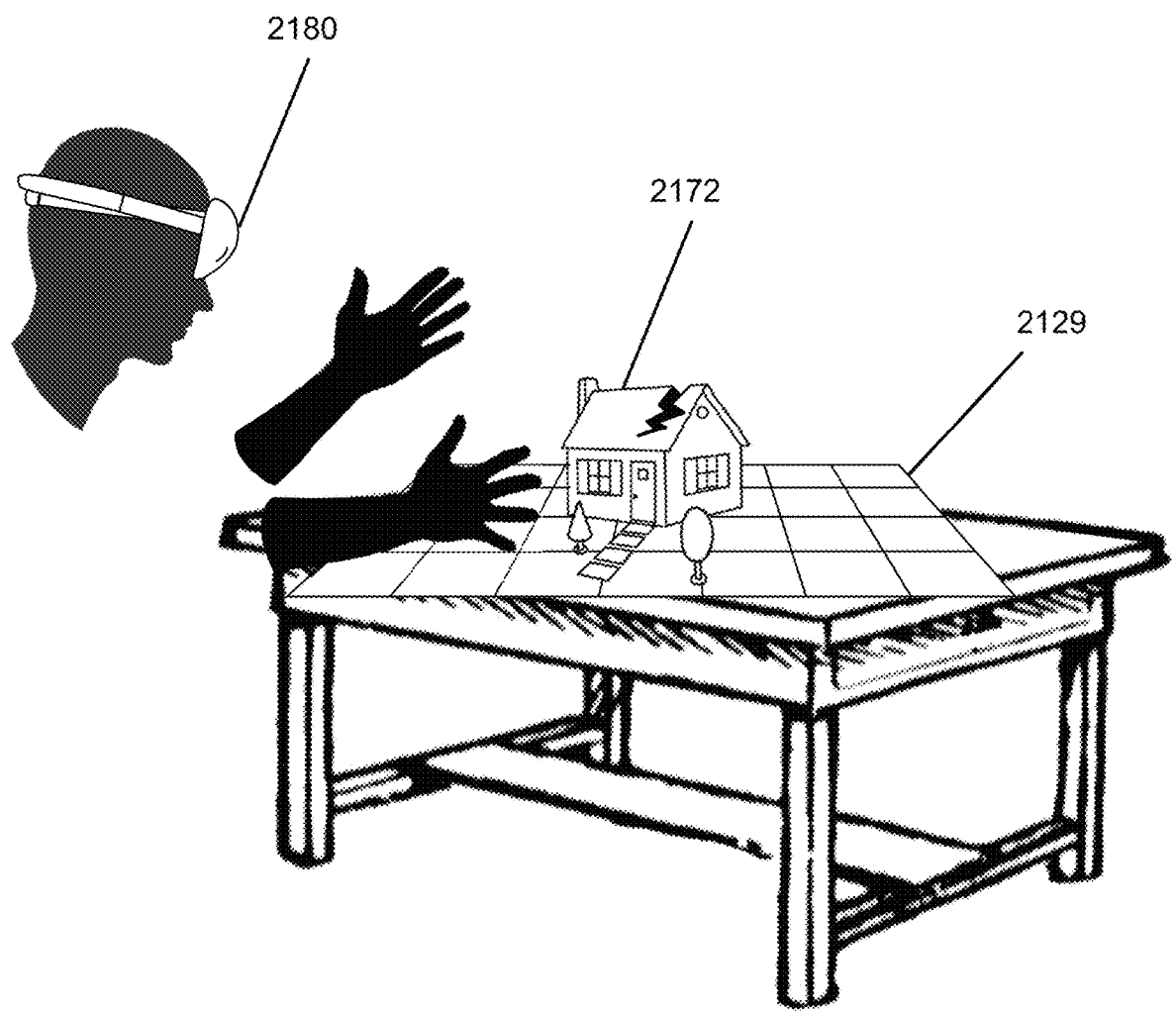
FIG. 21 depicts a virtual environment that includes a rendering of a virtual model of an indicated area within an overall region.

FIG. 21 depicts a virtual environment 2129 that includes a rendering of the virtual model of an indicated area 2172 within an overall region. The rendering of the virtual model of the indicated area 2172 may be rendered separately from a virtual environment that includes a rendered virtual model of the overall region (such as the virtual environment 2028 of FIG. 20). A user electronic device 2180 (such as the user electronic device 580 of FIG. 5) may render the virtual environment 2129 in response to the user 2010 selecting the prompt within the overlay 2076 of FIG. 20.

Figure 22:
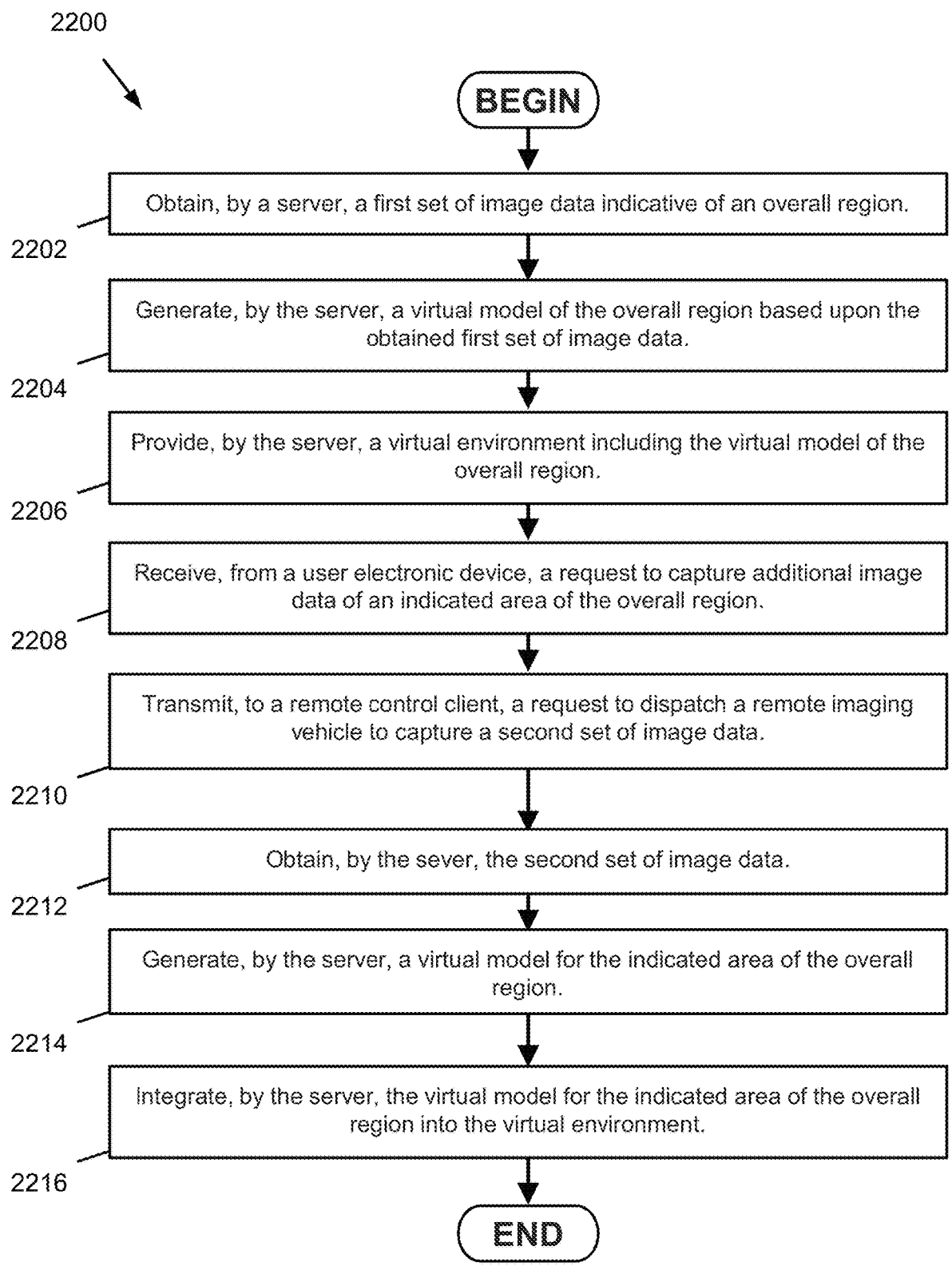
FIG. 22 depicts a flow chart of an example method for integrating a virtual model for an indicated area within an overall region with a virtual model for the overall region.

FIG. 22 depicts a flow chart of an example method 2200 for integrating a virtual model for an indicated region with a virtual model for an overall region. The method may be executed by a server (such as the server 520 of FIG. 5) in communication with a user electronic device (such as the user electronic device 580 of FIG. 5). The method 2200 may begin when the server obtains a first set of image data indicative of the overall region (block 2202). As described herein, the first set of image data may be stored in an image database (such as the image database 534 of FIG. 5) after being captured by an imaging vehicle (such as the imaging vehicle 540 of FIG. 5). Because the imaging vehicle may capture the first set of image data from a high altitude without focusing on any particular feature of the overall region, the first set of image data may include relatively low-resolution image data of the particular features.

At block 2204, the server may generate a virtual model of the overall region based upon the obtained first set of image data. To this end, the server may analyze the first set of image data to generate a three dimensional object having dimensions representative of the various features of the overall region. The server may then map the first set of image data onto appropriate dimensions of the three dimensional object to produce a virtual model of the overall region and the various feature therein. After generating the virtual model, the server may store the virtual model in a model database (such as the model database 536 of FIG. 5).

At block 2206, the server may provide a virtual environment including the virtual model of the overall region to the user electronic device for rendering. To support the rendering of the virtual environment, the server may correlate the virtual coordinates of the virtual environment with corresponding geographic coordinates of the overall region. Accordingly, the virtual coordinates at which each feature of the virtual environment is located are correlated to the corresponding geographic coordinates at which the physical feature is located within the overall region. As a result, the server creates a match between specific regions within the virtual environment and corresponding specific regions within the overall region.

Depending on the particular type of user electronic device, the server may generate a mixed reality environment in which both virtual objects and physical objects may be viewed, or a virtual reality environment in which only virtual objects may be viewed. Accordingly, when a user attempts to view a virtual environment, the user electronic device may transmit an indication of the type(s) of environments the user electronic device supports. In embodiments that implement communication networks having sufficiently low latency, the user electronic device may also indicate whether to process the rendering locally at user electronic device or remotely at the server.

At block 2208, the server may receive, from the user electronic device, a request to capture additional image data of an indicated area within the overall region (such an indicated feature or a region of interest). For example, the user may interact with an overlay rendered in the virtual environment to transmit the request. As described herein, the request may include coordinates associated with the indicated area. In some embodiments, the coordinates may be virtual coordinates defined by the virtual environment. Accordingly, the server may convert the virtual coordinates to geographic coordinates. In other embodiments, the request may include geographic coordinates.

Additionally, in some embodiments, the server may assign an identifier to each feature (such as a point of interest) of the virtual environment for which a virtual model of the feature exists. For example, the server may assign a structure feature an identifier of STRUCXY123. Thus, any virtual model for that structure may be accessed by querying the model database using that identifier. The model database may be further configured to store one or more attributes associated with that feature. For example, the attributes may include geographic coordinates of the feature, customer data associated with the feature, model version data, and so on. Accordingly, in some embodiments, the indication of the coordinate may be an indication of the identifier of the feature. To this end, the server may determine the geographic coordinates for the feature by using the received identifier to query the model database.

At block 2210, the server may transmit, to a remote control client (such as the remote control client 560 of FIG. 5), a request to dispatch the imaging vehicle to capture a second set of image data. The second set of image data may include image data representative of the indicated area within the overall region. Accordingly, the server may include geographic coordinates of the indicated area in the request. Additionally or alternatively, the server may analyze the geographic coordinates to determine a travel path for the imaging vehicle and transmit the travel path to the remote control client.

At block 2212, the server may obtain the second set of image data. To this end, after the imaging vehicle captures the second set of image data, the second set of image data may be stored in the image database. At block 2214, the server may generate a virtual model for the indicated area within the overall region. The server may use the second set of image data to generate the virtual model for the indicated area within the overall region. It should be appreciated that because the imaging vehicle is instructed to capture the second set of image data by focusing on the indicated area within the overall region, the virtual model for the indicated area within the overall region may have a higher resolution than the virtual model for the overall region. The server may then store the virtual model of the indicated area within the overall region in the model database.

At block 2216, the server may integrate the virtual model for the indicated area within the overall region into the virtual environment. In some embodiments, the server integrates the virtual model of the indicated area within the overall region within the virtual environment by updating the virtual environment to include the virtual model. To this end, the server may update the virtual environment such that the virtual environment includes a first layer and a second layer. The first layer may be rendered by a user electronic device when a zoom level exceeds a threshold zoom level and the second layer may be rendered by a user electronic device when the zoom level is within the threshold zoom level. Accordingly, the user electronic device may render the first layer of the virtual environment by rendering the virtual model of the overall region without rendering the virtual model for the indicated area within the overall region. On the other hand, the user electronic device may render the second layer of the virtual environment by rendering the virtual model for the indicated area within the region instead of the virtual model of the overall region at the virtual location associated with indicated area within the overall region. When updating the virtual environment to include the virtual model of the indicated area within the overall region, the server may utilize a reference object within the virtual environment to match a scale of the virtual model for the indicated area within the overall region to a scale of the virtual model of the overall region.

In another embodiment, the server may integrate the virtual model of the indicated area within the overall region into within the virtual environment by generating a link included in an overlay of the virtual environment. Accordingly, when a user selects the link, the user electronic device stops rendering the virtual environment that includes the virtual model of the overall region and begins rendering a new virtual model that only includes the virtual model of the indicated area within the overall region.

While the method 2200 is described as processing a single request to capture a second set of image data, in some embodiments, any number of users may interact with respective user electronic devices to initiate the capture of any number or additional sets of image data. In some scenarios, if the server receives requests to capture multiple sets of image data, the server may transmit instructions to the remote control client to ensure that each received request is fulfilled within a single dispatch of the remote imaging vehicle. In other scenarios in which the remote control client controls operation of multiple remote imaging vehicles, the server may divide the requests based on proximity of the respective indicated areas and assign the request to a particular remote imaging vehicle. Accordingly, the server may request the remote control client to dispatch multiple remote imaging vehicles to capture image data based on the requests assigned to each remote imaging vehicle.

ADDITIONAL CONSIDERATIONS

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112 (f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A method, comprising:
  receiving, by a processor, first image data associated with a geographic region, the first image data characterized by a first radiation type and including metadata indicative of physical coordinates of an imaging device at a time of capture of the first image data by the imaging device;
  generating, by the processor, a first virtual model of the geographic region using the first image data;
  determining, by the processor and based on the first image data, a first structure included in the first virtual model;
  determining, by the processor and using the first virtual model, virtual coordinates indicating a first location of the first structure in the first virtual model;

identifying, by the processor and based on the metadata, a second location within the geographic region that corresponds to the virtual coordinates,
  wherein the second location is identified without receiving user input indicative of the second location or the first structure;
accessing, by the processor, physical coordinates indicating geographic locations of structures associated with one or more customers;
determining, by the processor, a match between a particular physical coordinate of the physical coordinates and the second location,
  wherein the particular physical coordinate corresponds to a second structure of the structures, the second structure being associated with a particular customer of the one or more customers;
receiving, by the processor, second image data associated with the second location characterized by a second radiation type, different from the first radiation type;
generating, by the processor and based on the second image data, a second virtual model of the second location, the second virtual model being of same dimension as the first virtual model of the second location;
based on determining the match:
  generating, by the processor and based on the first virtual model and the second virtual model, a composite virtual model of the second location;
  generating, by the processor and based on the composite virtual model, a three-dimensional (3D) virtual environment illustrating the first structure disposed within the geographic region, and
  generating, by the processor, a digital link between the first structure in the 3D virtual environment and a stored digital record associated with the particular customer; and
providing, by the processor and to an electronic device, the 3D virtual environment including a representation of the digital link.

2. The method of claim 1, wherein the first image data is further characterized by a first resolution, the method further comprising:
receiving, by the processor, third image data associated with the second location, the third image data characterized by a second resolution greater than the first resolution; and
generating, by the processor, a third virtual model of the second location using the third image data,
wherein the 3D virtual environment is generated based on the first virtual model and the third virtual model.

3. The method of claim 2, further comprising:
generating, by the processor, a link to view the third virtual model within the virtual environment; and
providing, by the processor, the link as a selectable user interface element within the virtual environment when the virtual environment is rendered at the electronic device.

4. The method of claim 2, wherein:
the third virtual model is included in a first layer of the virtual environment, the first layer being configured to be rendered on the electronic device when a selected zoom level is within a zoom range associated with the third virtual model, and
the first virtual model is included in a second layer of the virtual environment, the second layer being configured to be rendered on the electronic device when the selected zoom level is outside of the zoom range associated with the third virtual model.

5. The method of claim 1, wherein the virtual environment comprises a multi-spectral representation of at least a part of the geographic region including the second location, the multi-spectral representation including the first radiation type and the second radiation type.

6. The method of claim 1, wherein the electronic device comprises a mixed reality display device or a mixed reality headset.

7. The method of claim 1, wherein the first image data associated with a first time, the method further comprising:
receiving, by the processor, third image data associated with the second location captured at a second time different from the first time; and
determining, by the processor, using the virtual environment, and based on the third image data, a damage level associated with the first structure.

8. The method of claim 1, further comprising:
storing, by the processor and in an image database accessible to the processor, the first image data;
storing, by the processor and in a model database separate from the image database, the first virtual model;
detecting, by the processor, that second image data has been added to the image database; and
generating, by the processor and based on detecting that the second image data has been added, the second virtual model using the second image data.

9. A system, comprising:
a processor; and
a non-transitory memory coupled to the processor and storing executable instructions that, when executed by the processor, cause the processor to:
  receive first image data associated with a geographic region, the first image data characterized by a first radiation type and including metadata indicative of physical coordinates of an imaging device at a time of capture of the first image data by the imaging device;
  generate a first virtual model of the geographic region using the first image data;
  determine, based on the first image data, a first structure included in the first virtual model;
  determine, based on the first virtual model, virtual coordinates indicating a first location of the first structure in the first virtual model;
  identify, based at least in part on the metadata, a second location within the geographic region that corresponds to the virtual coordinates,
    wherein the second location is identified without receiving user input indicative of the second location or the first structure;
  access, from a customer information database, physical coordinates indicating geographic locations of structures associated with one or more customers;
  determine a match between a particular physical coordinate of the physical coordinates and the second location,
    wherein the particular physical coordinate corresponds to a second structure of the structures, the second structure being associated with a particular customer of the one or more customers;
  receive second image data associated with the second location characterized by a second radiation type, different from the first radiation type;
  generate, based on the second image data, a second virtual model of the second location, the second virtual model being of same dimension as the first virtual model of the second location;

based on determining the match:

generate, based on the first virtual model and the second virtual model, a composite virtual model of the second location;

generate, based on the composite virtual model, a three-dimensional (3D) virtual environment illustrating the first structure disposed within the geographic region, and generate a digital link between the first structure in the 3D virtual environment and a stored digital record associated with the particular customer; and provide, to an electronic device, the 3D virtual environment including a representation of the digital link.

10. The system of claim 9, wherein the first image data is further characterized by an image capture characteristic comprising one or more of: a resolution of capture, a time of capture, a capture rate, an angle of capture, an altitude of capture, and a travel path of a camera.

11. The system of claim 10, wherein the first image data is characterized by an image capture characteristic having a first value, and the instructions further cause the processor to:

receive third image data associated with the geographic region, the third image data characterized by a second value of the image capture characteristic different from the first value; and generate a third virtual model of the geographic region using the third image data, wherein the 3D virtual environment is based on the first virtual model and the third virtual model.

12. The system of claim 11, further comprising a model database accessible by the processor, wherein:

the first virtual model is stored in the model database and indexed by the first value; and the third virtual model is stored in the model database and indexed by the second value.

13. The system of claim 9, wherein the instructions further cause the processor to:

determine, based on the second location, that damage has occurred at the geographic region;

receive, third image data associated with the geographic region, the third image data captured at a time after the damage has occurred; and determine, based on the composite virtual model and the third image data, a damage level associated with the first structure.

14. The system of claim 13, wherein the instructions further cause the processor to:

generate, based on the third image data, an overlay representing the first structure; and provide the overlay to be displayed within the 3D virtual environment when rendered on the electronic device.

15. The system of claim 9, wherein:

the virtual environment comprises a multi-spectral representation of at least a part of the geographic region, the multi-spectral representation including the first radiation type and the second radiation type.

16. A system, comprising:

a means for electronic communication via a communication network;

a means for storing executable instructions;

a means for viewing a virtual environment; and a means for executing the executable instructions, the means for executing being configured to:

receive, via the means for electronic communication, first image data associated with a geographic region, the first image data characterized by a first radiation type and including metadata indicative of physical coordinates of an imaging device at a time of capture of the first image data by the imaging device;

generate a first virtual model of the geographic region using the first image data;

determine, based on the first image data, a first structure included in the first virtual model;

determine, based on the first virtual model, virtual coordinates indicating a first location of the first structure in the first virtual model;

identify, based at least in part on the metadata, a second location within the geographic region that corresponds to the virtual coordinates, wherein the second location is identified without receiving user input indicative of the second location or the first structure;

access, from a customer information database, physical coordinates of structures associated with one or more customers, wherein:

a physical coordinate of the physical coordinates indicates a geographic location of a structure of the structures;

determine a match between a particular physical coordinate of the physical coordinates and the second location, wherein the particular physical coordinate corresponds to a second structure of the structures, the second structure being associated with a particular customer of the one or more customers;

receive second image data associated with the second location characterized by a second radiation type, different from the first radiation type;

generate, based on the second image data, a second virtual model of the second location, the second virtual model being of same dimension as the first virtual model of the second location;

based on determining the match:

generate, based on the first virtual model and the second virtual model, a composite virtual model of the second location;

generate, based on the composite virtual model, a three-dimensional (3D) virtual environment illustrating the structure disposed within the geographic region, and generate a digital link between the first structure in the 3D virtual environment and a stored digital record associated with the particular customer; and cause the 3D virtual environment including a representation of the digital link to be presented by the means for viewing a 3D virtual environment.

17. The system of claim 16, wherein the first image data is further characterized by a first resolution, the system further comprising a means for capturing images, wherein the means of executing is further configured to:

receive, from the means for capturing images, third image data characterized by a second resolution greater than the first resolution, wherein the third image data illustrates the geographic region from a plurality of viewing perspectives;

generate a third virtual model of the geographic region using the third image data;

generate a link to view the third virtual model within the virtual environment; and cause the link to be presented as a selectable user interface element within the virtual environment when the virtual environment is rendered at the means for viewing a virtual environment.

18. The system of claim 16, wherein the means of executing is further configured to:

receive, from the means for viewing a virtual environment, information indicative of a viewing angle associated with the virtual environment; and cause the virtual environment to be depicted at the viewing angle on the means for viewing a virtual environment.

* * * * *